United States Patent
Kashioka

(10) Patent No.: US 7,747,036 B2
(45) Date of Patent: Jun. 29, 2010

(54) DOCUMENT PROCESSING USING EMBEDDED DOCUMENT INFORMATION

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 11/432,518

(22) Filed: May 12, 2006

(65) Prior Publication Data

US 2006/0265242 A1 Nov. 23, 2006

(30) Foreign Application Priority Data

| May 20, 2005 | (JP) | ............................. 2005-148554 |
| Dec. 1, 2005 | (JP) | ............................. 2005-347868 |

(51) Int. Cl.
*G06K 9/00* (2006.01)
(52) U.S. Cl. .................................................. 382/100
(58) Field of Classification Search ................ 382/100, 382/101, 112, 113, 135–140; 235/454, 470, 235/426.01; 705/1; 358/1.13, 1.15; 713/176, 713/178
See application file for complete search history.

(56) References Cited

U.S. PATENT DOCUMENTS

| 2003/0063326 | A1 | 4/2003 | Kiyono et al. ............... 358/440 |
| 2005/0094178 | A1* | 5/2005 | Anno ........................ 358/1.13 |
| 2006/0215224 | A1* | 9/2006 | Matsumoto ................ 358/1.18 |
| 2006/0265743 | A1 | 11/2006 | Kusunoki .................... 726/21 |
| 2007/0176001 | A1* | 8/2007 | Cattrone et al. ........ 235/462.01 |

FOREIGN PATENT DOCUMENTS

| JP | 10289308 | 10/1998 |
| JP | 2001103228 | 4/2001 |
| JP | 2002354212 A | 12/2002 |
| JP | 2004326441 | 11/2004 |
| JP | 2004343236 | 12/2004 |
| JP | 2005086709 | 3/2005 |
| JP | 2005123980 | 5/2005 |

OTHER PUBLICATIONS

Japanese Office Action dated Mar. 5, 2010 in corresponding Japanese Application No. 2005148554.

* cited by examiner

*Primary Examiner*—Samir A Ahmed
*Assistant Examiner*—Atiba O Fitzpatrick
(74) *Attorney, Agent, or Firm*—Fitzpatrick, Cella, Harper & Scinto

(57) ABSTRACT

In this invention, reading conditions for registration are determined in accordance with a document. This allows a user to read a document under recommended reading conditions without any special knowledge, and register the document in a predetermined server after performing anti-tampering processing on the document. For this purpose, a document is read by prescan in accordance with predetermined conditions, and information embedded in a predetermined marker in the read image data is extracted. On the basis of the extracted embedded information, reading condition information of the document is acquired. In accordance with the acquired conditions, the document is read by main scan. After that, at least one of electronic signature information and time stamp information is added to the image data obtained by the main scan. And the added image data are transmitted to and registered in a predetermined server on a network.

21 Claims, 19 Drawing Sheets

FIG. 19

STORAGE MEDIUM SUCH AS FD / CD-ROM

| DIRECTORY INFORMATION |
| --- |
| FIRST DATA PROCESSING PROGRAM PROGRAM CODES CORRESPONDING TO STEPS OF FLOWCHART SHOWN IN FIG. 3 |
| SECOND DATA PROCESSING PROGRAM PROGRAM CODES CORRESPONDING TO STEPS OF FLOWCHART SHOWN IN FIG. 4 |
| THIRD DATA PROCESSING PROGRAM PROGRAM CODES CORRESPONDING TO STEPS OF FLOWCHART SHOWN IN FIG. 5 |
| FOURTH DATA PROCESSING PROGRAM PROGRAM CODES CORRESPONDING TO STEPS OF FLOWCHART SHOWN IN FIG. 6 |
| FIFTH DATA PROCESSING PROGRAM PROGRAM CODES CORRESPONDING TO STEPS OF FLOWCHART SHOWN IN FIG. 7 |
| SIXTH DATA PROCESSING PROGRAM PROGRAM CODES CORRESPONDING TO STEPS OF FLOWCHART SHOWN IN FIG. 16 |
| SEVENTH DATA PROCESSING PROGRAM PROGRAM CODES CORRESPONDING TO STEPS OF FLOWCHART SHOWN IN FIG. 9 |
| EIGHTH DATA PROCESSING PROGRAM PROGRAM CODES CORRESPONDING TO STEPS OF FLOWCHART SHOWN IN FIG. 10 |

MEMORY MAP OF STORAGE MEDIUM

DOCUMENT PROCESSING USING EMBEDDED DOCUMENT INFORMATION

FIELD OF THE INVENTION

The present invention relates to a technique which reads and electronizes a document page having a predetermined format, and registers the document page in a predetermined apparatus.

BACKGROUND OF THE INVENTION

Recently, a service concept called a document management system (to be referred to as DMS hereinafter) which facilitates search of document information overflowing in an office by rearranging and storing them as a database is brought into conversation more often than before.

One possible reason is that pieces of information (documents) have been exchanged by paper media until recently, but these documents keep building up, and it is very troublesome to search a large number of documents for necessary information. Another reason is that the use of paper media makes it difficult to share documents among many people.

On the other hand, it is prescribed by law that some documents related to financial affairs and taxation business be preserved as paper media. With the advance of the IT-oriented society, however, a law which allows preserved scan data obtained by electronizing documents to be regarded as legally evidential is beginning to be enforced. A requirement of these laws is a mechanism which prevents tampering of scan data obtained by electronizing documents. Another requirement is a scanning function for faithfully reproducing documents having existed as paper media when electronized scan data is viewed by an image viewer application or the like. Techniques such as an electronic signature and time stamp are used to prevent tampering of scan data. The reproduction quality of electronized documents depends on a scanner apparatus and scanning conditions.

The law which allows documents having existed as paper media to be electronized and preserved often specifies the certificate authority (CA) of an electronic certificate necessary to generate an electronic signature for preventing tampering of scan data, in accordance with the guideline indicated by each public agency. Also, since various types of paper media are used, the scanning conditions must be set in accordance with paper media themselves in order to faithfully reproduce documents.

There is a known technique by which a sheet for giving scan instructions is inserted as the first page of document pages as objects of main scan, thereby notifying a scanner apparatus of the reading conditions of the following document pages to be mainly scanned without causing the user to designate the scanning conditions every time (e.g., Japanese Patent Laid-Open No. 2002-354212).

In the technique disclosed in the above reference, however, a special sheet must be prepared. In addition, the user must know which guideline indicated by a public agency a paper medium to be read matches.

Furthermore, to verify the contents of scan data preserved before, a document to be verified is searched by using the attribute information of the document as a keyword. However, the attribute information of a document to be preserved together with scan data changes from one document type to another. This makes it difficult for a user to recognize the document attribute information to be preserved in relation to the document type.

Also, in a document management server which preserves scan data obtained by reading document pages, a database must be manually designed so that document attributes corresponding to document types can be preserved.

SUMMARY OF THE INVENTION

The present invention has been made to solve the above problems. It is an object of the present invention to provide a technique which allows a user to scan document pages without knowing details of the document page reading conditions, and preserve image data so processed as to prevent tampering of the document in a server on a predetermined network.

It is another object of the present invention to provide a mechanism capable of reducing the operation load on a user by automatically setting document page reading conditions (electronizing conditions) which change from one document type to another. It is still another object of the present invention to make it possible to automatically generate image data read by the electronizing conditions, time stamp information, and document image attribute information, and automatically transfer and register them into a server apparatus designated by embedded information.

To achieve the above objects, a document image processing apparatus of the present invention has the following arrangement. That is, embedded information acquiring means for acquiring information embedded in first image data of a document;

electronizing condition acquiring means for acquiring an electronizing condition of the document on the basis of the embedded information acquired by the embedded information acquiring means;

image acquiring means for acquiring second image data by reading the document on the basis of the acquired electronizing condition;

adding means for adding at least one of electronic signature information and time stamp information to the second image data acquired by the image acquiring means; and storage means for storing, in a data storage device, the second image data to which at least one of the electronic signature information and the time stamp information is added by the adding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 is a view showing the memory map of a storage medium which stores a data processing program in the sixth embodiment.

DETAILED DESCRIPTION OF THE PREFERRED EMBODIMENTS

Embodiments according to the present invention will now be described in detail in accordance with the accompanying drawings.

First Embodiment

The first embodiment of the present invention will be explained below with reference to FIGS. 1 to 10.

Figure 1:
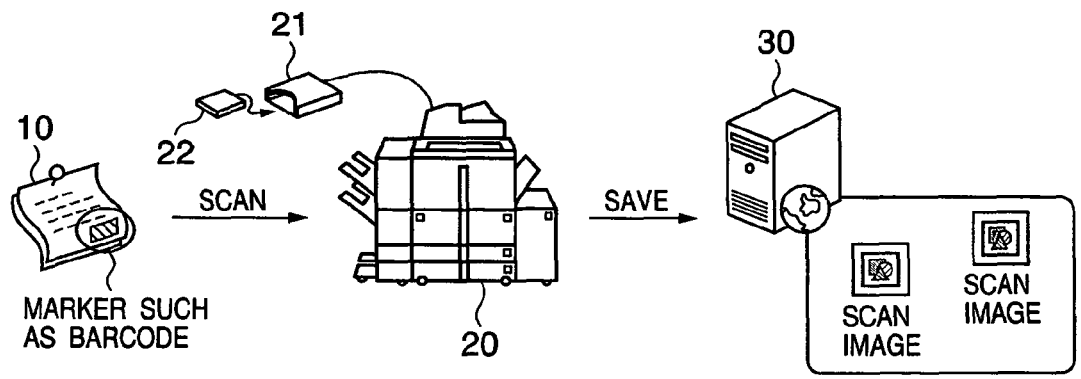
FIG. 1 is a view showing the system configuration of a document registration system according to an embodiment.

FIG. 1 is a view showing the system configuration of a document registration system according to the embodiment. This system comprises a multifunctional peripheral device (to be referred to as an MFP device hereinafter) 20 having a function of reading document pages (forms), and a file server 30 which is provided by a service provider and stores the read document data. The MFP device 20, the file server 30, and an authentication server are connected across a network (including the Internet).

The MFP 20 is connected to an IC card reader 21 which reads out information serving as an electronic certificate of an individual, corporation, or the like from an IC card 22 storing the information. Although the MFP 20 and IC card reader 21 are connected by using a USB interface in this embodiment, it is of course also possible to use another interface. In addition, the IC card reader 21 need not be externally attached and may also be incorporated into the MFP 20 itself. Note that although this embodiment takes the IC card as an example of the storage medium storing the electronic certificate information, another storage medium such as a flexible disk may also be used. That is, a device which read-accesses the storage medium need only be connected to or incorporated into the MFP 20.

Although details will be described later, image data of a document read by the MFP 20 is finally saved in a predetermined folder of the file server 30. To perform an upload (document registration) process of uploading the read document image data to the file server 30, the MFP 20 of this embodiment reads a document 10 by two passes, i.e., prescan and main scan. Setting information (to be described in detail later) of, e.g., the reading conditions of main scan is printed/added as a marker such as a two-dimensional code on the document 10. When prescan is performed, therefore, setting for the processing of main scan is performed by reading the marker and decoding the setting information.

Note that FIG. 1 shows an example in which the MFP 20 exists on a LAN in an office and the file server exists on the Internet. Note also that not only routers for connecting to the Internet but also various devices (PCs, printers, and servers) generally exist in an office, and the number of MFPs 20 is not limited to one. However, FIG. 1 does not show any such arrangement.

Figure 2:
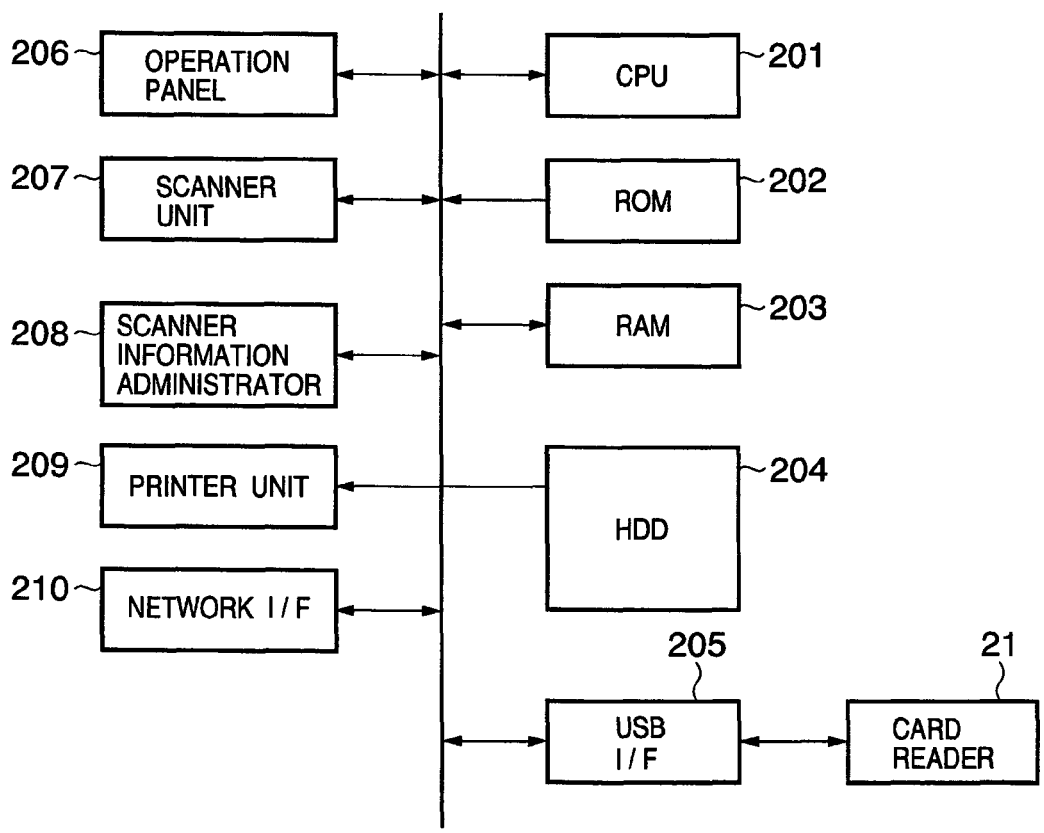
FIG. 2 is a block diagram showing an example of an MFP device in the document registration system according to the embodiment.

FIG. 2 is a block diagram showing the MFP device 20 for performing document registration according to this embodiment.

Referring to FIG. 2, a CPU 201 controls the entire device by loading, into a RAM 203, a program stored in a ROM 202 or a program and GUI-related data stored in an HDD 204 as a large-capacity storage device, and executing the loaded program. The IC card reader 21 is connected to a USB interface 205. An operation panel 206 includes various switches and buttons and a touch panel (a transparent pressure-sensitive coordinate input device and liquid crystal display), and functions as a user interface. A scanner unit 207 has at least a function of reading a document image as a color image (therefore, also has a function of reading a document image as a monochrome image), and can read documents at a plurality of resolutions. A scanner information management unit 208 stores the functions/states of the scanner unit 207. For example, when an automatic document feeder (ADF) is mounted on the scanner unit 207, the scanner information management unit 208 stores this information. The MFP device 20 also functions as a general copying machine or network printer, and hence further includes a printer unit 209 and network interface 210.

The MFP device 20 of this embodiment can also perform a normal copying process. Assuming that this process is performed by the well-known processing, however, an outline of the processing of a document registration process application executed by the CPU 201 of the MFP 20 will be explained below with reference to a flowchart shown in FIG. 3.

First, in step S101, the CPU 201 displays, on the operation panel 206, a message which prompts the user to set an IC card in the card reader, set the document 10 on the scanner unit 207, and press a start button, thereby allowing him or her to perform these operations. When the start button on the operation panel 206 is pressed, the CPU 201 reads out electronic certificate information capable of specifying an individual from the IC card 22 set in the IC card reader 21, and causes the scanner unit 207 to execute prescan, thereby extracting setting information embedded in a marker on the document 10. The CPU 201 temporarily saves the document image obtained by prescan in the RAM 203.

Then, in step S102, the CPU 201 acquires main scan reading condition information contained in the setting information obtained in step S101.

In step S103, the CPU 201 checks the validity of the electronic certificate in the IC card set by the user in step S101. If the validity is denied, the CPU 201 displays an error message indicating that the validity cannot be confirmed, and does not execute any further processing.

In step S104, the CPU 201 acquires the address (URL) of a time stamp server from the setting information obtained in step S101, saves the address in the RAM 203, and tries to connect to the corresponding time stamp server. The time stamp server is a server for setting the input date/time of an electronic document (a document image in this embodiment). If it is impossible to connect to the time stamp server, the CPU 201 displays an error message indicating the failure of connection to the time stamp server, and does not perform any further processing.

Then, in step S105, the CPU 201 acquires specific area information (to be described in detail later) in accordance with the setting information obtained in step S101, and determines whether there is a description in the corresponding specific area of the prescanned image data stored in the RAM 203. This is equivalent to determining whether there is a description in an indispensable portion of the document. If no such description is found, the CPU 201 displays an error message indicating that there is no input to the indispensable item, and does not perform any further processing.

In step S106, the CPU 201 displays a folder configuration (secured for each user) acquired from the file server 30 on the display panel 206 of the MFP device 20, and the user designates a storage location of the scan data.

Subsequently, in step S107, the CPU 201 sets the scanner unit 207 in accordance with the scan information acquired in step S102, and performs main scan. The CPU 201 processes the document image data output from the scanner unit 207 as a result of the main scan, on the basis of the information acquired in steps S103 to S105.

In step S108, the CPU 201 transmits the scan data obtained in step S107 to that folder in the file server 30, which is designated by the user, so that the data is stored in the folder.

Note that in this embodiment, the processes in steps S102 to S105 are executed serially. However, these processes may also be executed by a different sequence regardless of the order of steps S102 to S105. This similarly applies to steps S102 to S106.

Although an outline of the processing of the embodiment is explained above, this processing will be explained in more detail below.

[Embedded Information Extraction Process (Step S101)]

Figure 4:
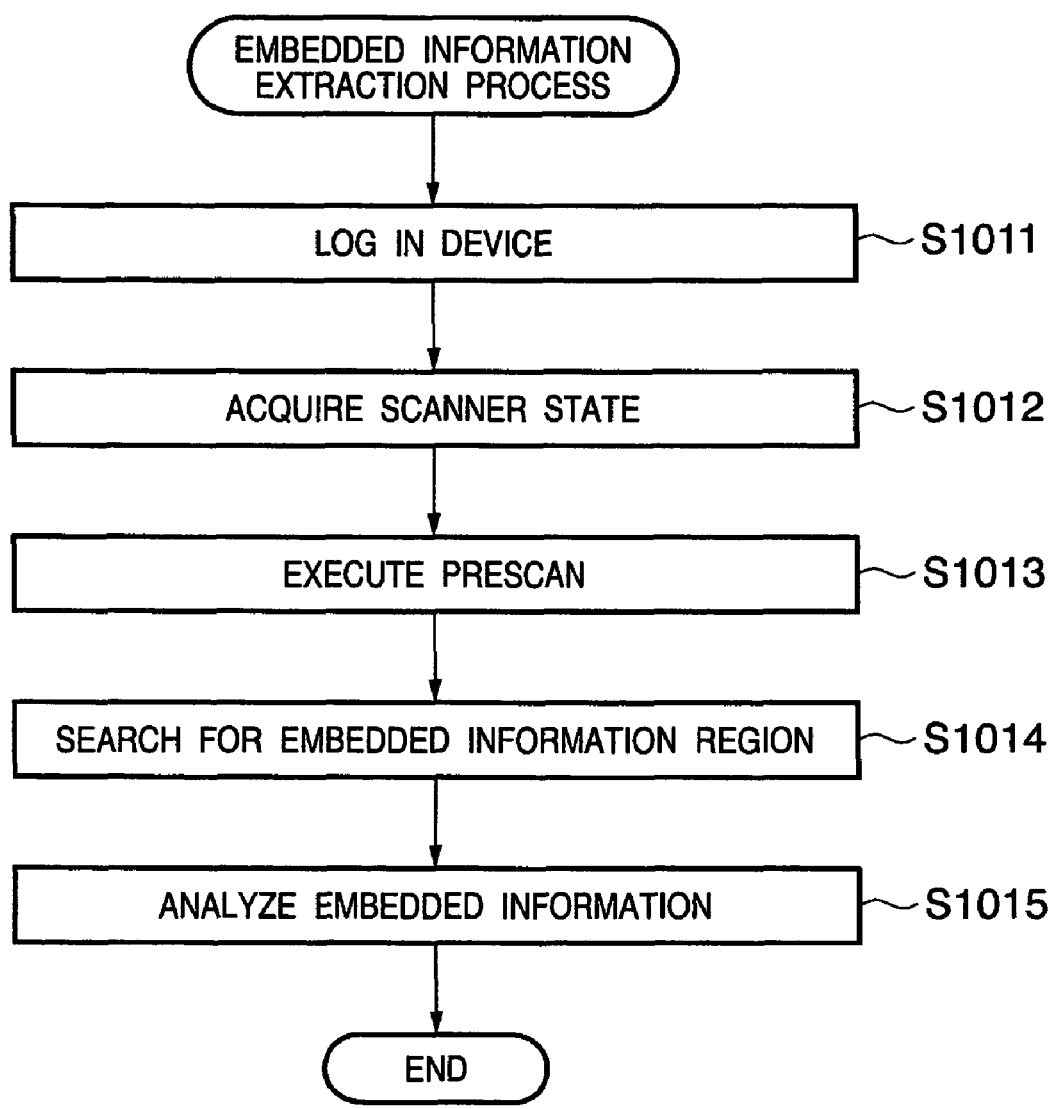
FIG. 4 is a flowchart showing details of a process of extracting embedded information from a document in the document registration system according to the embodiment.

First, the process of extracting the embedded information from the document 10 in step S101 will be explained with reference to a flowchart shown in FIG. 4.

In step S1011, the user inserts the IC card 22 containing an electronic certificate capable of specifying an individual into the IC card reader 21 connected to the MFP device 20. When detecting the insertion of the IC card 22, the MFP device 20 determines that this is a login request. Therefore, the MFP device 20 loads an application of the document registration system from the HDD 204 into the RAM 203, and executes the application. As a result, the application displays a user interface on the display device (touch panel) of the operation panel 206.

Note that the main purpose of the electronic certificate is to add an electronic signature to the scan data in step S107 described previously. However, this electronic certificate may also be used as a function of authenticating login to the MFP device 20, or as a function of authenticating login to a document management system in the file server 30 provided by the service provider, on the basis of the known PKI (Public Key Infrastructure) technique.

Then, in step S1012, the CPU 201 acquires that state information of the scanner unit 207, which is saved in the scanner information administrator 208, and temporarily stores the information in the RAM 203. The state information of the scanner unit 207 indicates whether the scanner unit 207 is operable, or whether an ADF (Auto Document Feeder) is attached. Note that the state information may also contain another information. If the CPU 201 determines that the scanner unit 207 is inoperable, it does not perform any further processing.

If the CPU 201 determines that the scanner unit 207 is operable, the flow advances to step S1013, and the CPU 201 loads a document registration application of this embodiment from the HDD 204 into the RAM 203, and executes the application. As a consequence, the operation panel 206 displays a message which prompts the user to set a document and press the start button, and a GUI related to the message. Although the start button is a button displayed by the GUI in this embodiment, it may also be a button physically formed on the operation panel 206. When the user sets the document 10 on the scanner unit 207 and presses the start button, prescan is executed. Since the purpose of this prescan is to read the marker embedded in the document 10, the settings of the read mode are monochrome, simple binary, and a resolution of 200 dpi. That is, the document is read by this mode regardless of the immediately preceding read mode. However, this is merely an example, and some other conditions may also be used. The document image data obtained by the prescan is temporarily stored in the RAM 203.

Subsequently, in step S1014, the CPU 201 searches the prescanned image data stored in the RAM 203 for the position of the marker embedded in the document 10. This search technique can be the existing one. If this marker detection fails, however, the CPU 201 determines that the document does not have any predetermined format, displays an error message indicating this information, and does not perform any further processing.

In step S1015, on the basis of an image in the marker position obtained by the search, the CPU 201 extracts the embedded setting information (electronizing condition information). In this embodiment, the setting information contains scan setting information for executing main scan, time stamp server information for acquiring a time stamp, information for confirming the validity of the electronic certificate, and information for designating a specific area of the document 10. However, the setting information may also contain another information.

[Scan Setting Acquisition Process (Step S102)]

Figure 5:
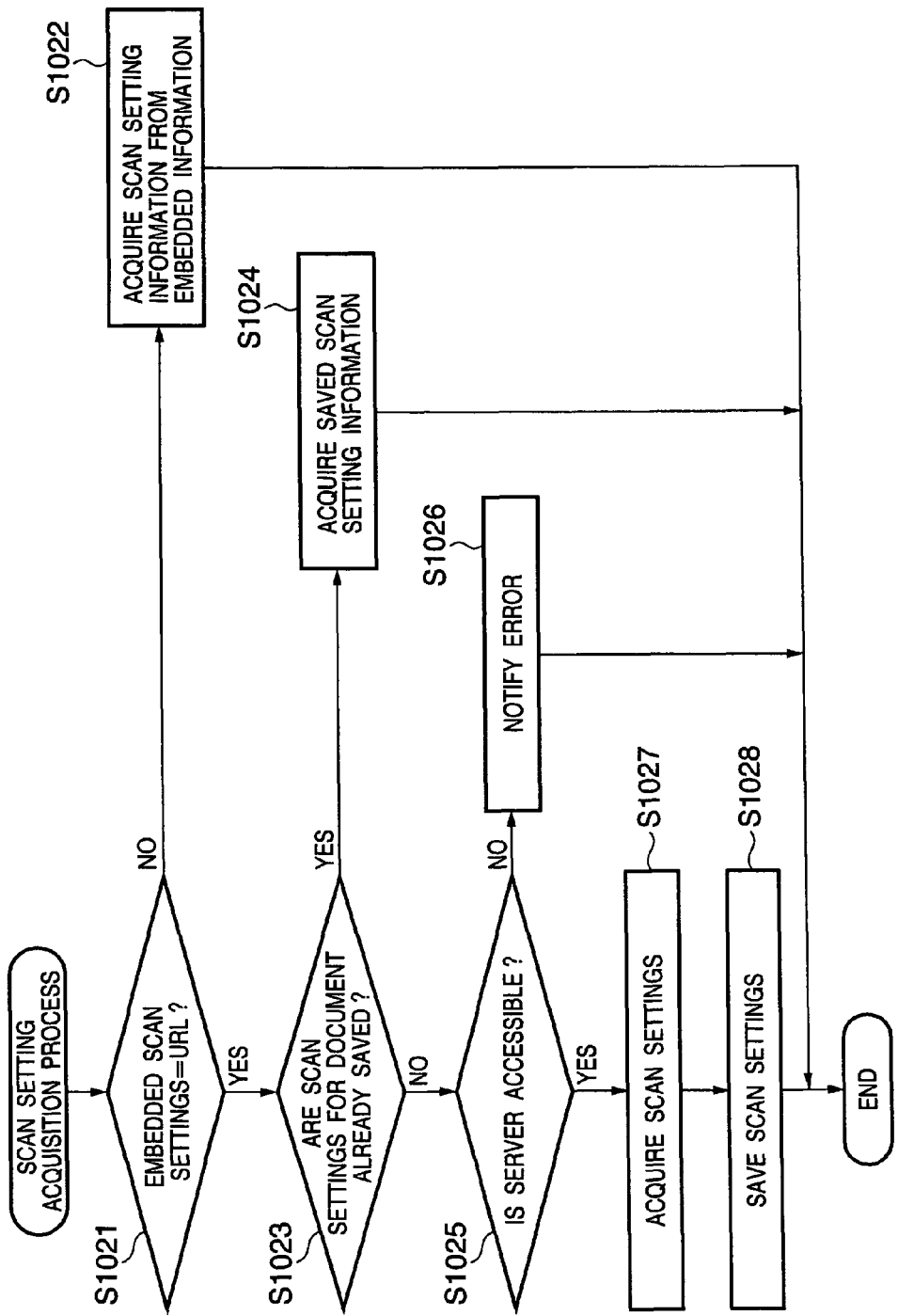
FIG. 5 is a flowchart showing a sequence of acquiring scan setting information for executing main scan, on the basis of the embedded information, in the document registration system according to the embodiment.

The scan setting information acquisition process in step S102 of FIG. 3 will be described below with reference to a flowchart in FIG. 5.

First, in step S1021, the CPU 201 determines whether the scan setting information contained in the setting information extracted in step S101 indicates a URL for acquiring main scan setting information or indicates the main scan setting information itself.

The scan setting information is described as a URL in order to access a server (provided by the manufacturer of the document 10 or by a public agency which assigns a duty to electronically preserve the document 10), and acquire the main scan setting information. Accordingly, it is possible to construct a system more flexible than the system in which the document 10 fixedly has the scan setting information. In addition, the use of a URL obviates the need to describe various parameters of the scan setting information, thereby reducing the information amount embedded in the marker. This also means that the marker size can be decreased.

If the CPU 201 determines in step S1021 that not a URL but the main scan setting information is stored in the marker, the flow advances to step S1022, and the CPU 201 acquires this main scan setting information, temporarily saves the information in the HDD 204, and also stores the information in the RAM 203. Note that the data stored in the HDD 204 is kept stored until the document image is transmitted to the file server 30, and deleted when the transmission is completed. The data will be deleted because the latest information is acquired from the network when document read is performed next.

If the CPU 201 determines in step S1021 that the description of the main scan setting information embedded in the marker is a URL, the flow advances to step S1023, and the CPU 201 determines whether scan setting information corresponding to the document 10 is already saved. This process is performed to avoid the decrease in processing speed by omitting the processes of prescan and marker position determination for each document page when a plurality of document pages are to be read. However, document pages to be set on the scanner must be the same type of document pages.

If the CPU 201 determines in step S1023 that the scan setting information is already stored in the HDD 204, the flow advances to step S1024, and the CPU 201 reads out the scan setting information from the HDD 204, and stores the readout information in the RAM 203.

If the CPU 201 determines in step S1023 that no scan setting information is stored in the HDD 204, the flow advances to step S1025, and the CPU 201 accesses the server of the URL embedded in the marker via the network interface 210, and determines whether the server is connectable. If NO in step S1025, the CPU 201 displays an error message on the operation panel 206 in step S1026, and terminates the processing. Note that if the CPU 201 performs the error display process in step S1026, it returns a value indicating "not executable" to the main routine (FIG. 3) so as not to perform any further processing.

If the CPU 201 can access the server indicated by the URL in step S1025, the flow advances to step S1027, and the CPU 201 acquires the main scan setting information from the server. In step S1028, the CPU 201 stores the acquired main scan setting information in the HDD 204 and RAM 203, and terminates the processing.

Note that in the above description, the main scan setting information is deleted after the document image is transmitted to the file server 30. However, the following processing is also possible.

First, the user stores the type of document 10 to be used in the HDD 204 in relation to the URL of the document 10. The MFP device 20 periodically (e.g., once a week) accesses a server indicated by the URL stored in the HDD 204, and acquires and holds the latest information. This period can be set in the MFP device 20 by the user.

Note that the main scan setting information contains information about a color mode indicating whether to read a document as a color image or monochrome image, the number of tones (a multi-value image or simple binary image) for reading, the reading resolution, the reading density, and the file format (e.g., JPEG, GIF, Tiff, or BMP) of read image data.

[Confirmation of Certificate (Step S103)]

Figure 6:
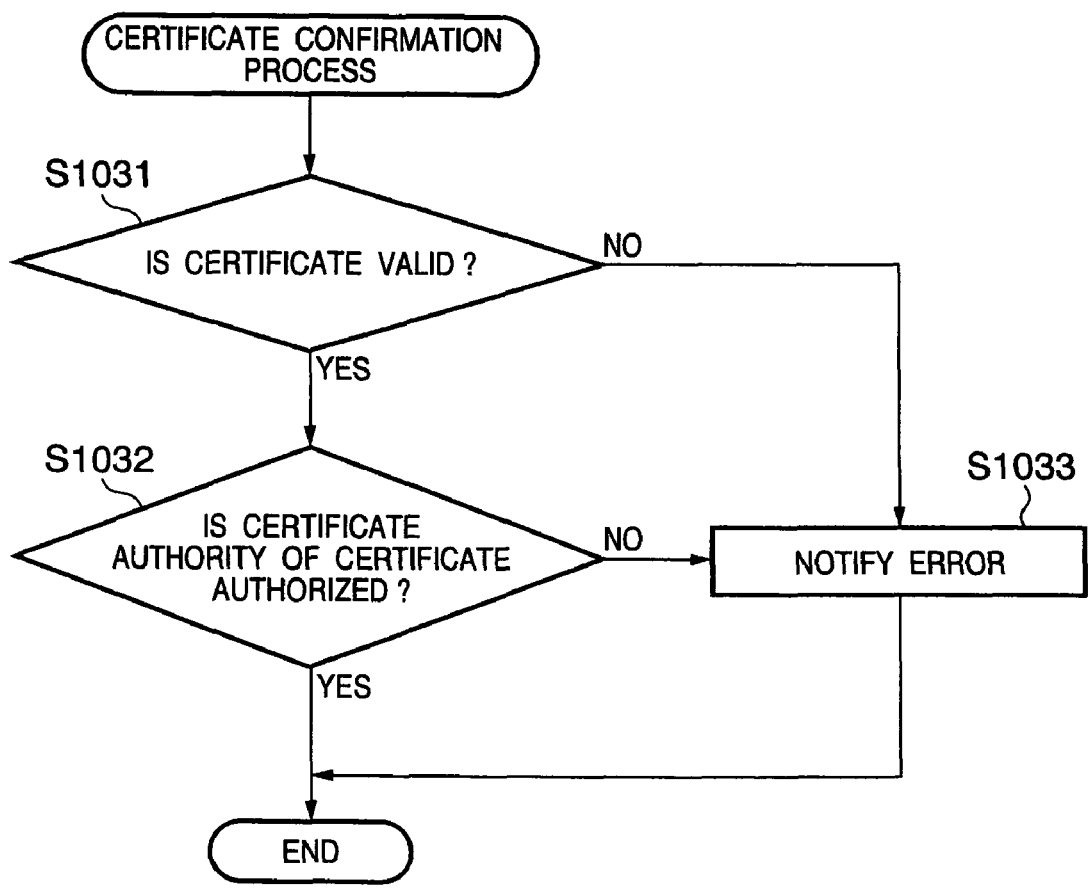
FIG. 6 is a flowchart showing a sequence of confirming the validity of an electronic certificate in the document registration system according to the embodiment.

The process of confirming the validity of the electronic certificate in step S103 of FIG. 3 will be explained with reference to a flowchart in FIG. 6.

Figure 3:
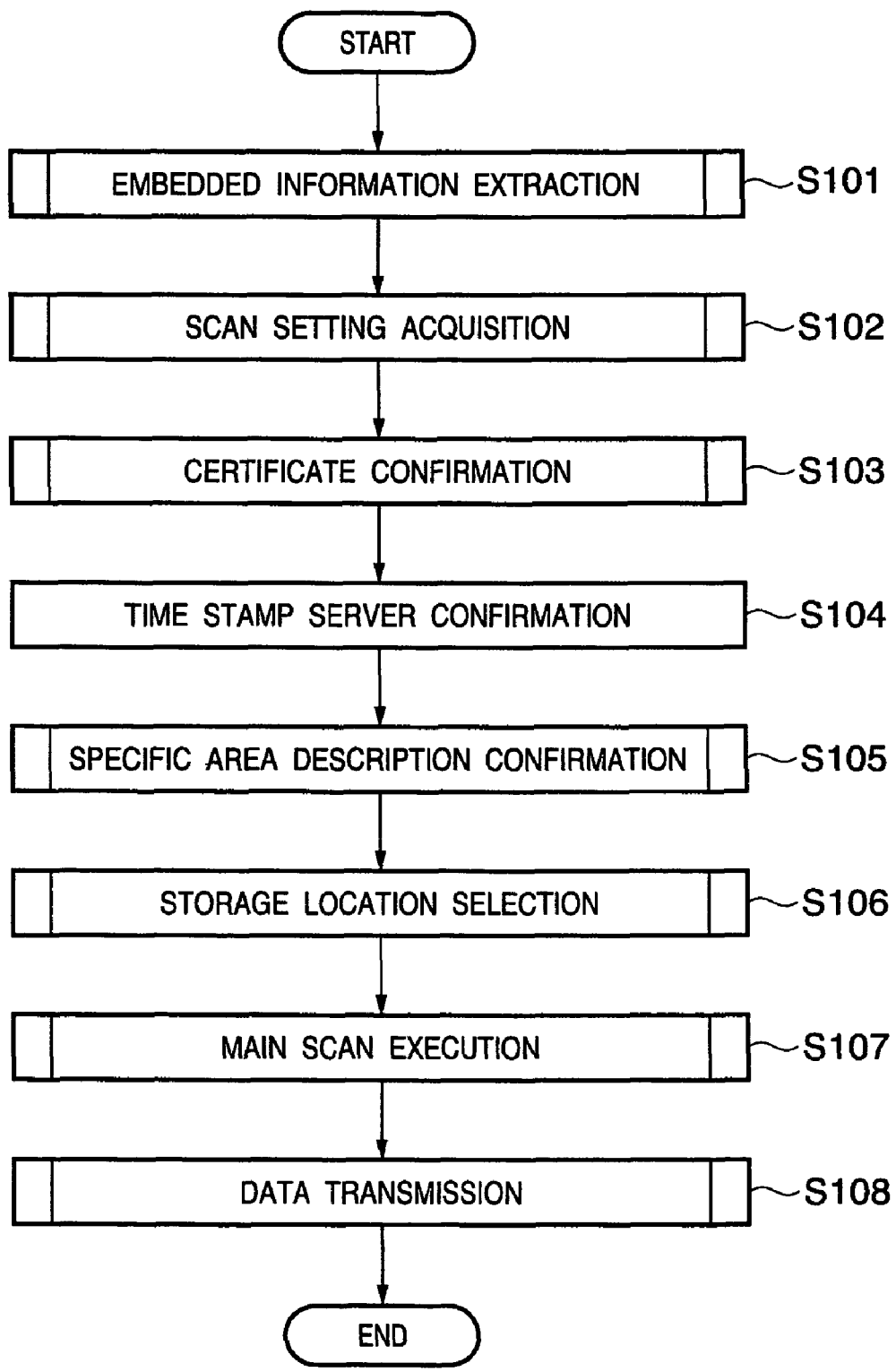
FIG. 3 is a flowchart showing the flow of a process of registering scan data in the document registration system according to the embodiment.

As already described above, information of the electronic certificate is acquired from the IC card 22 inserted into the IC card reader 21 by the user in step S101 of FIG. 3.

In step S1031, therefore, the CPU 201 acquires the validity time described in the electronic certificate in the IC card 22 or a CRL (Certificate Revocation List) by accessing a specific authentication server via the network interface 210, thereby determining whether the certificate is valid. Note that the validity of the electronic certificate may also be checked by some other contents.

If the validity is confirmed, the flow advances to step S1032, and the CPU 201 determines whether the certificate authority (business entity) of the electronic certificate used to form an electronic signature to be added to scan data when the document 10 is scanned and saved is authorized. More specifically, since the URL of the certificate authority is described in the electronic certificate, the CPU 201 accesses the server of the certificate authority, and acquires a list of certificate authorities of authorized electronic certificates. The CPU 201 compares the electronic certificate described in the IC card 22 with the list of certificate authorities of authorized electronic certificates, and determines whether the certificate authority is authorized.

As described above, the latest information can always be obtained by acquiring the list of certificate authorities of authorized electronic certificates from the authentication server. Note that it is also possible to periodically access the server and update the list of certificate authorities of authorized electronic certificates, regardless of the scanning operation.

If the validity of the electronic certificate is denied in step S1031, or if it is determined in step S1032 that the electronic certificate is unauthorized in the list of certificate authorities, the flow advances to step S1033, and the CPU 201 displays an error message on the operation panel 206 of the MFP device 20. Note that if the CPU 201 displays the error message, it returns information indicating the inability to continue any further processing to the main routine (FIG. 3).

[Confirmation of Description in Specific Area (Step S105)]

The process of determining whether there is a description in the specific area (indispensable item) of the image data (held in the RAM 203) obtained by prescanning the document 10 in step S105 of FIG. 3 will be explained with reference to a flowchart in FIG. 7.

First, in step S1051, the CPU 201 determines whether information concerning the specific area is stored as coordinate position information or described in the form of a URL in the setting information extracted in step S101 described earlier. If the CPU 201 determines that the specific area setting information is described as the coordinate position information, the flow advances to step S1052, and the CPU 201 acquires the corresponding coordinate position information in the prescanned document image stored in the RAM 203, and saves the information in the RAM 203 and HDD 204. After that, the flow advances to step S1057 (to be described later).

If the CPU 201 determines in step S1051 that the information concerning the specific area is the information in the form of a URL, the flow advances to step S1053, and the CPU 201 determines whether the information concerning the specific area is saved in the HDD 204. If YES in step S1053, the flow advances to step S1054, and the CPU 201 stores the information in the RAM 203. The flow then advances to step S1057. In this manner, the processing speed can be increased by omitting accessing the server in accordance with the description of the URL, when a plurality of document pages are to be read.

If the CPU 201 determines in step S1053 that no information concerning the specific area is saved in the HDD 204, the flow advances to step S1055. In step S1055, the CPU 201 tries to connect to the certificate authority of the document 10 or the server managing the indispensable item position of the document 10 via the network interface 210 in accordance with the acquired URL, and determines whether the access is possible.

If the CPU 201 determines that the access is impossible, the flow advances to step S1059, and the CPU 201 displays a message indicating this information on the operation panel 206, and terminates the processing. Note that if the CPU 201 performs this process in step S1059, it returns information indicating the inability to continue any further processing to the main routine.

If the CPU 201 determines in step S1055 that the access is possible, the flow advances to step S1056, and the CPU 201 acquires, from the accessible server, setting information (coordinate information) indicating the specific area designated by the public agency which assigns a duty to electronically preserve the document 10, and saves the information in the RAM 203 and HDD 204. After that, the flow advances to step S1057.

In step S1057, the CPU 201 determines whether there is a description in that coordinate region of the document image data obtained by prescanning, which is indicated by the coordinate information concerning the specific area stored in the RAM 203. This determination can be performed on the basis of whether there is a density change in the target coordinate region. If the CPU 201 determines that nothing is described, the flow advances to step S1059, and the CPU 201 displays an error message indicating "no description" on the operation panel 206. If nothing is described, therefore, complicated processing such as an OCR process need not be performed, so an omission and the like can be found at high speed accordingly.

If the CPU 201 determines in step S1057 that something is described in the specific area, the flow advances to step S1058, and the CPU 201 performs an OCR process on this coordinate region, stores the result of the OCR process in the RAM 203, and terminates the processing. This OCR result may also be used as a search index (attribute information) of the document image. These search indices are stored in a database for managing images stored in individual folders. Preferably, whether correct information is described is determined on the basis of the result of the OCR process, and, if no correct information is described, an error message is displayed.

[Selection of Storage Location (Step S106)]

The process in step S106 of FIG. 3 will be explained with reference to FIG. 8. This process sets a storage destination in the file server 30 where document image data obtained by main scan is to be stored. Assume that the file server 30 provided by the service provider has an exclusively secured area for each user (or corporation), and prevents any irrelevant third party from accessing the folder.

First, in step S1061, the CPU 201 acquires a folder list (folder configuration information) at the root from the file server 30, and displays the list in the form of a tree structure on the operation panel 206. If a subfolder exists below a certain folder, the CPU 201 displays the list so that the existence of this subfolder can be identified. The CPU 201 also displays, on the operation panel 206, a selection determination button and a folder expansion button for designating expansion of a subfolder list.

The user selects a desired folder displayed on the operation panel 206 (the selected folder is highlighted so as to be distinguished from unselected folders), and presses the selection determination button or folder expansion button.

If the folder expansion button is pressed in step S1062, the flow advances to step S1063, and the CPU 201 requests the file server 30 for structure information of subfolders positioned below the selected folder, and acquires the structure information. In step S1064, the CPU 201 displays a list of the subfolders positioned below the selected folder on the operation panel 206 on the basis of the acquired structure list, and the flow returns to step S1061. In step S1061, therefore, the user can select a desired subfolder. If subfolders further exist below the displayed subfolder, the CPU 201 displays the subfolders in the lower layer by repeating the above process.

If the CPU 201 determines in step S1065 that the folder selection determination button is pressed, it determines the selected folder (or subfolder) as a final storage location, and terminates the processing.

[Main Scan (Step S107)]

Figure 9:
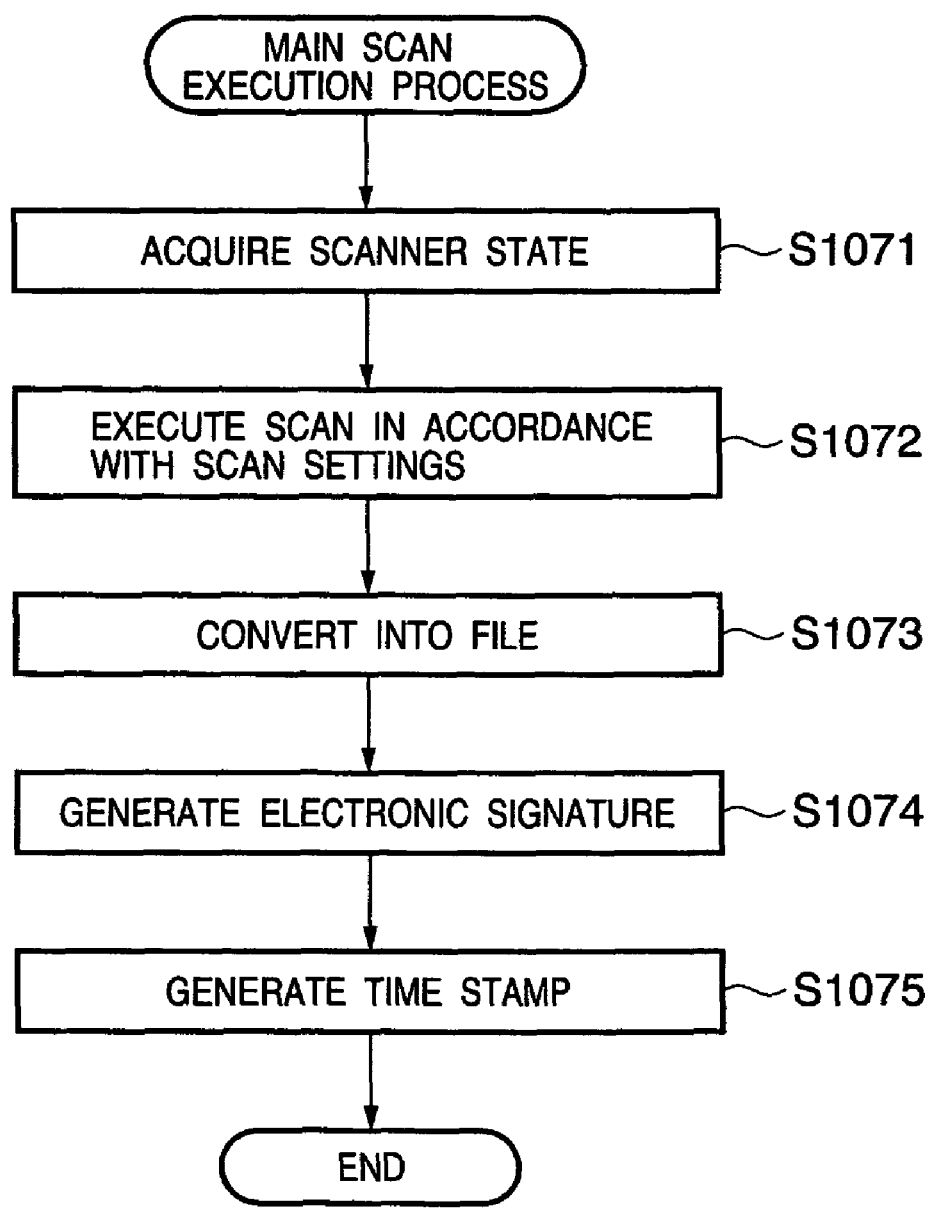
FIG. 9 is a flowchart showing a sequence of executing main scan and performing processing in the document registration system according to the embodiment.
Figure 10:
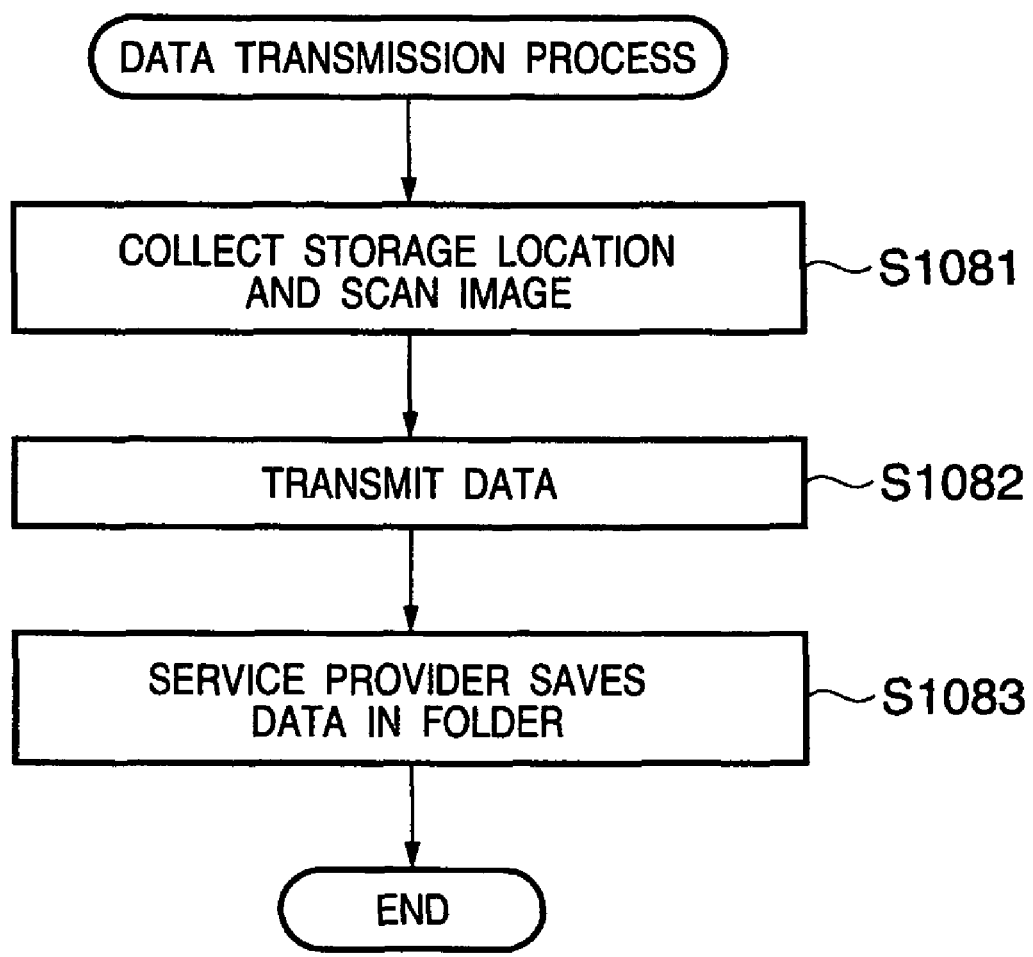
FIG. 10 is a flowchart showing a sequence of storing a scan data file and additional information in a file server of the service provider in the document registration system according to the embodiment.

Details of the main scan process in step S107 of FIG. 3 will be explained with reference to a flowchart in FIG. 9. Note that the main scan setting information is stored in the RAM 203 as already described above.

First, in step S1071, the CPU 201 acquires scanner information from the scanner information administrator 208.

Then, in step S1072, the CPU 201 sets the reading mode, the number of tone bits, the reading density, and the resolution in accordance with the main scan setting information stored in the RAM 203, and executes main scan on the document 10 set on the scanner unit 206. The CPU 201 temporarily stores the read document image data in the RAM 203.

In step S1073, the CPU 201 converts the document image data read by the main scan into a file format set by the main scan setting information, and temporarily stores the file in the HDD 204.

Subsequently, in step S1074, the CPU 201 generates an electronic signature for the file obtained in step S1073, by using that electronic certificate in the IC card, which is obtained in step S101 (FIG. 3). The techniques for generating electronic signatures are well known. For example, if the file obtained in step S1073 is a PDF, an electronic signature can be embedded in the PDF, or electronic signature information may also be generated as a different file.

In step S1075, the CPU 201 accesses the time stamp server, for the file obtained in step S1073 or for the file in which the electronic signature obtained in step S1074 is embedded, by using the time stamp server information stored in the RAM 203 in step S104 (FIG. 3), and generates a time stamp. The time stamp technique is a well-known protocol as defined in RFC3161. That is, the obtained time stamp token can be embedded in the file or generated as a different file.

Note that the scan data file, electronic signature information, and time stamp obtained in steps S1072 to S1076 are saved in the HDD 204. If the RAM 203 has a large capacity, these data may also be saved in the RAM 203. Note also that the order of the processes in steps S1074 and S1075 is not particularly limited. That is, either of the two steps can be performed first, and the two steps can be performed in parallel.

[Data Transmission and Save (Step S108)]

The process in step S108 of FIG. 3 will be explained below. This process transmits the document image data file and additional information (electronic signature and time stamp information) obtained by the main scan in step S107 to the folder designated in the file server provided by the service provider described earlier, and saves the data file and information in the folder. Details of the process will be described with reference to a flowchart in FIG. 10.

First, in step S1081, the CPU 201 collects the image file, electronic signature information, and time stamp of the document image data, which are obtained in step S107, and that storage folder name of the file server provided by the service provider, which is designated by the user in step S106. The collected information can be temporarily saved in the RAM 203 or saved in the HDD 204.

In step S1082, the CPU 201 connects to the file server 30 via the network interface 210. The CPU 201 then acquires, from the RAM 203, the image data file (document image), electronic signature information, time stamp, OCR result, and storage location information obtained in step S1081, and transmits the file, information, and the like to that folder in the file server 30, which is indicated by the storage location information, so that they are stored in the folder. In this case, the image file and the electronic signature information or time stamp may also be transmitted as different files. Alternatively, as indicated in step S107, if the image file has a predetermined format such as a PDF format, it is also possible to embed the electronic signature information or time stamp in this PDF file and transmit them as one file.

In step S1083, although this step is not the processing performed by the MFP 20, the file server 30 provided by the service provider saves the received file in the designated folder.

In this embodiment as described above, when a document (the document 10 in the embodiment) related to financial affairs or taxation business is to be electronized and saved in a server provided by a service provider or the like, it is possible to automatically read the document under recommended conditions and electronize the read document into a recommended file format, even when the user does not have any special knowledge of the reading conditions of the document. Also, information such as an electronic signature or time stamp is automatically added when the file is saved in the server. This makes it possible to prevent tampering, and reduce the load on the user's operation.

In addition, when searching for a scan data file preserved in the service provider 30, the user of the MFP 20 need not know any requirements of each public agency, and can perform the search by using attribute information of the document to be preserved in accordance with the requirements of the public agency as a keyword (index).

Note that when the document 10 is, e.g., a receipt which belongs to taxation business, it is possible not only to preserve the date of issue of the receipt designated as the specific area in the document 10 but also to calculate and preserve the date as the taxation fiscal year, as the attribute information of the document to be preserved. Attribute information extracted from an image and preserved in the database is used as an index for searching the image.

The document registration system according to the first embodiment executes processing in accordance with, e.g., scan setting information embedded in a marker which is printed/added on a document. Therefore, the user can save scan data having undergone anti-tampering processing in the service provider 30 without performing any cumbersome operation of designating detailed scanning conditions.

Also, as various pieces of setting information, it is possible not only to use information embedded in a marker printed/added on a document, but also to acquire the latest information corresponding to the document from a requirement management server existing on the Intranet/Internet. Accordingly, it is possible to flexibly cope with update of the guideline designated by each public agency or update of the type of document to be processed.

Second Embodiment

Figure 11:
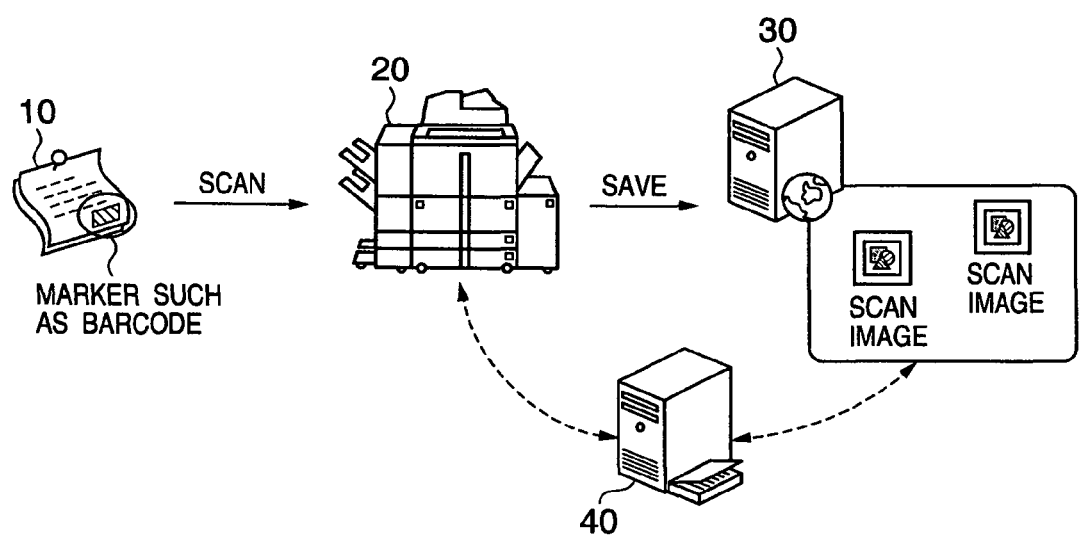
FIG. 11 is a view showing the system configuration of a document registration system according to the second embodiment.

FIG. 11 is a view showing the system configuration of a document registration system according to the second embodiment.

In the second embodiment, a document 10 on which setting information is printed/added as a marker such as a barcode, an MFP device 20 in which an application program for the document registration system according to this embodiment is installed, a service provider 30 having the function of a document management system, and an active directory server 40 for performing user management are connected across a LAN.

In the second embodiment, a case in which the individual components are connected across the network will be described. However, these components may also be connected across the Internet. In addition, although a case in which only one MFP device 20 exists will be explained, a plurality of MFP devices may also exist. Furthermore, the service provider 30 and active directory server 40 may also exist on the same PC.

The differences from the document registration system of the first embodiment are that no IC card reader 21 connectable to the MFP device 20 exists, and that the active directory server 40 performs coordinated user management (SSO) on the MFP device 20 and service provider 30.

Accordingly, when logging in to the MFP device 20, the user does not insert any IC card into the IC card reader 21, but directly inputs data to a login user interface (not shown) which the application of the document registration system according to the second embodiment displays on an operation panel 206 of the MFP device 20.

Also, in the document registration system according to the first embodiment, an electronic certificate exists on the IC card 22. In the document registration system according to the second embodiment, however, the active directory server 40 manages the electronic certificate of each user. This allows the user to use the electronic certificate for adding an electronic signature to scan data, without carrying any IC card. Note that the electronic certificate may also be saved in the MFP device 20 in relation to the user via the user interface of the MFP device 20. In the document registration system according to the second embodiment, therefore, the user can be surely specified by an electronic signature added to scan data even in an environment in which the active directory server 40 does not perform any coordinated user management on the MFP device 20 and service provider 30.

Third Embodiment

Figure 12:
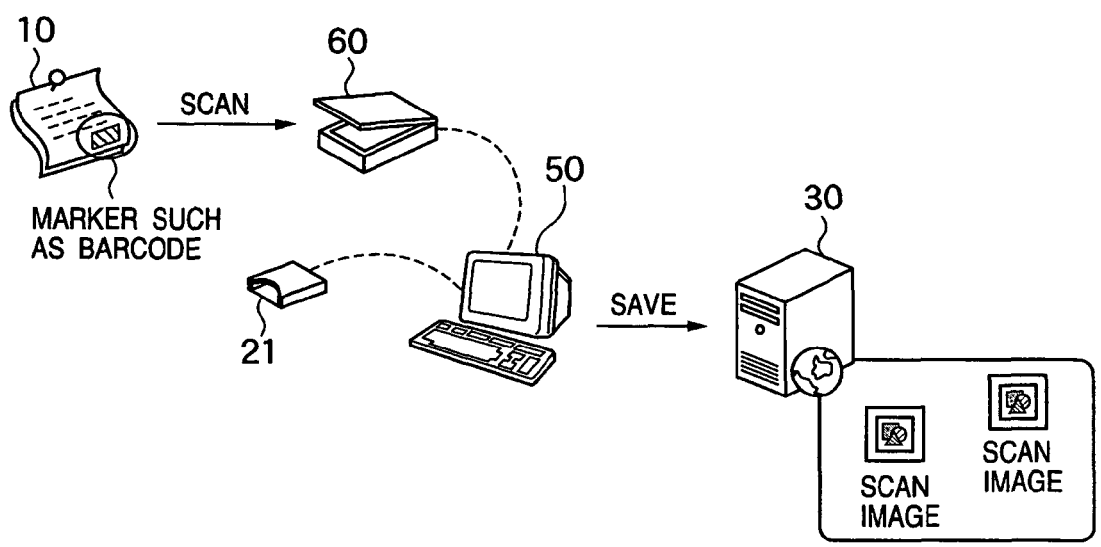
FIG. 12 is a view showing the system configuration of a document registration system according to the third embodiment.

FIG. 12 is a view showing the system configuration of a document registration system according to the third embodiment. In this embodiment, a document 10 on which setting information is printed/added as a marker such as a barcode, a client PC 50 in which an application program for the document registration system according to this embodiment is installed, and a file server 30 provided by a service provider and having the function of a document management system are connected across a network. The client PC 50 is also connected to an IC card reader 21 and consumer scanner 60 via cables such as USBs. In the third embodiment, a case in which the individual components are connected across a LAN will be described. However, these components may also be connected across the Internet. In addition, although a case in which only one consumer scanner 60 exists will be explained, a plurality of consumer scanners may also exist. Furthermore, the consumer scanner 60 and IC card reader 21 may also be connected via a medium/method other than the USB. Also, a medium connected to the consumer scanner 60 need not be the IC card reader 21. That is, it is only necessary to connect a medium such as a floppy disk (registered trademark) or USB memory in which an electronic certificate capable of specifying an individual user can be saved.

Note that in the third embodiment, an electronic certificate capable of specifying an individual user is saved in an IC card or the like. However, it is also possible to save electronic certificate information in relation to the user via a user interface provided by an application executed on the client PC 50. In addition, in a case in which an active directory server (not shown) performs coordinated user management (SSO) on the client PC 50 and service provider 30, if this active directory server manages the electronic certificate of each user, the user can use the electronic certificate for adding an electronic signature to scan data when logging in to the client PC 50.

The difference of the third embodiment from the document registration systems according to the first and second embodiments already explained is that the scanner device for reading the document 10 is not an MFP device but a consumer scanner. The application which implements the document registration system according to the third embodiment exists on the client PC 50. Accordingly, the user can use the system according to the third embodiment by using his or her own PC or consumer scanner device without using any other expensive scanner device such as an MFP device having many functions.

As explained above, the document registration system according to the third embodiment executes processing in accordance with, e.g., scan setting information embedded in a marker which Is printed/added on a document. Therefore, the user can save image data having undergone anti-tampering processing without performing any cumbersome operation of designating detailed scanning conditions.

Also, in the document registration system according to the first embodiment, as various pieces of setting information, it is possible not only to use information embedded in a marker printed/added on a document, but also to acquire the latest information corresponding to the document from a server existing across a network. Accordingly, it is possible to flexibly cope with, e.g., update of the guideline designated by each public agency.

In the document registration system according to the first embodiment, various pieces of setting information can be externally acquired. Therefore, the information amount to be embedded in the marker which is printed/added on a document can be reduced.

Also, whether processing is executable is determined in each processing step before main scan is actually performed. Accordingly, it is possible to avoid a situation in which the system causes an error in the middle of the processing and wastes main scan. In addition, even in an arrangement in which the user is charged whenever he or she acquires a time stamp from a time stamp server, unnecessary charging can be similarly avoided.

Furthermore, the document registration system according to the second embodiment allows the user to use the system without carrying any medium such as an IC card.

Also, the document registration system according to the third embodiment can be constructed by using an inexpensive consumer scanner without using any MFP device which is expensive as a scanner device.

Note that as is readily understood from the explanation of the third embodiment, although many processes require a document reader, the functions can be implemented by a computer program, so the present invention includes a computer program. Note also that a computer program is generally stored in a computer-readable storage medium such as a CD-ROM and made executable when copied to or installed in a system, so the present invention naturally includes a computer-readable storage medium.

In the first to third embodiments as explained above, the reading conditions for registration are determined by a document, so the document can be read under recommended reading conditions without any special knowledge of the user. In addition, a document having undergone anti-tampering processing can be registered in a predetermined server.

Fourth Embodiment

The fourth embodiment of the present invention will be described below with reference to the accompanying drawings. The fourth embodiment is a modification of the first embodiment already explained.

Figure 13:
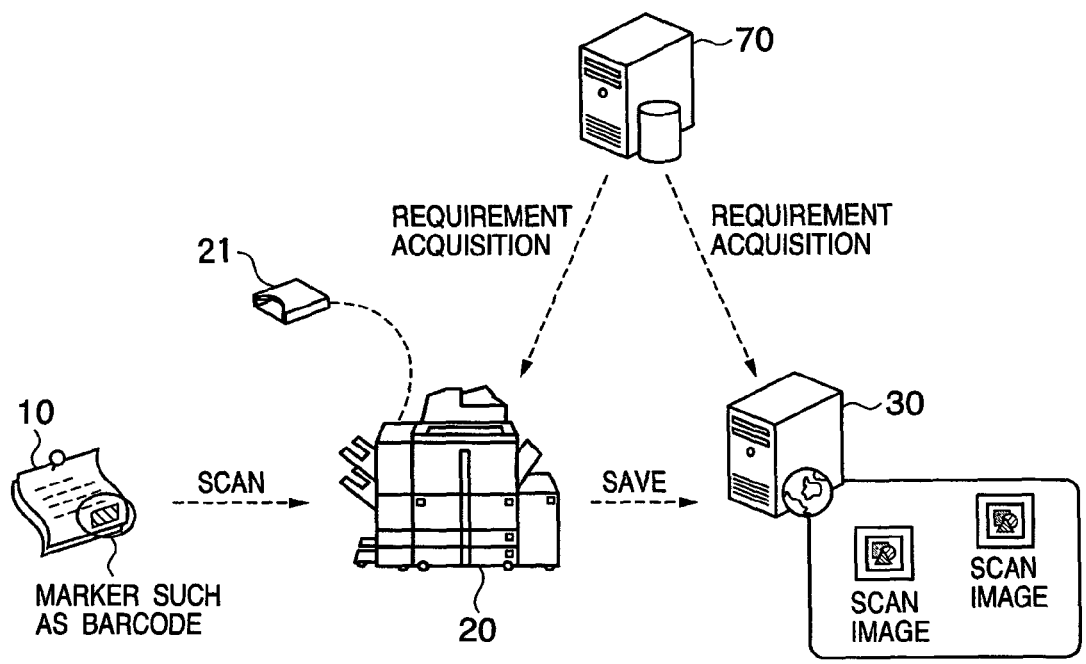
FIG. 13 is a view showing the system configuration of a document registration system according to the fourth embodiment.

FIG. 13 is a view showing the system configuration of the fourth embodiment. The difference from FIG. 1 is the addition of a requirement management server 70. Since the rest is the same as in FIG. 1, the same reference numerals denote the same parts, and an explanation thereof will be omitted.

The requirement management server 70 manages the latest template corresponding to each document type. The template contains database design information such as attribute information required in accordance with the document type and the data type of the attribute. The requirement management server 70 is also a server which stores and manages document reading condition information for each document type.

A scanner unit 207 of an MFP device 20 prescans a document, acquires electronizing conditions (reading conditions) in accordance with setting information of a barcode or two-dimensional code added to the document, and performs main scan in this embodiment as well. In addition, the MFP 20 gives an electronic signature and time stamp by using a personal electronic certificate of an IC card and an external reliable server apparatus which is determined in accordance with the setting information. The MFP 20 also transfers image data which is given the electronic signature and time stamp and the document attribute of the image data to a document management server apparatus (file server) of a service provider 30 in accordance with an address obtained by analyzing the setting information added to the document.

In this embodiment, a case in which the MFP device 20, service provider 30, and requirement management server 70 are connected across a LAN will be explained. However, these components may also be connected across the Internet.

Note that the marker (embedded information) printed/added on a document 10 need not be a barcode as long as it is decodable and can contain various pieces of setting information.

Figure 14:
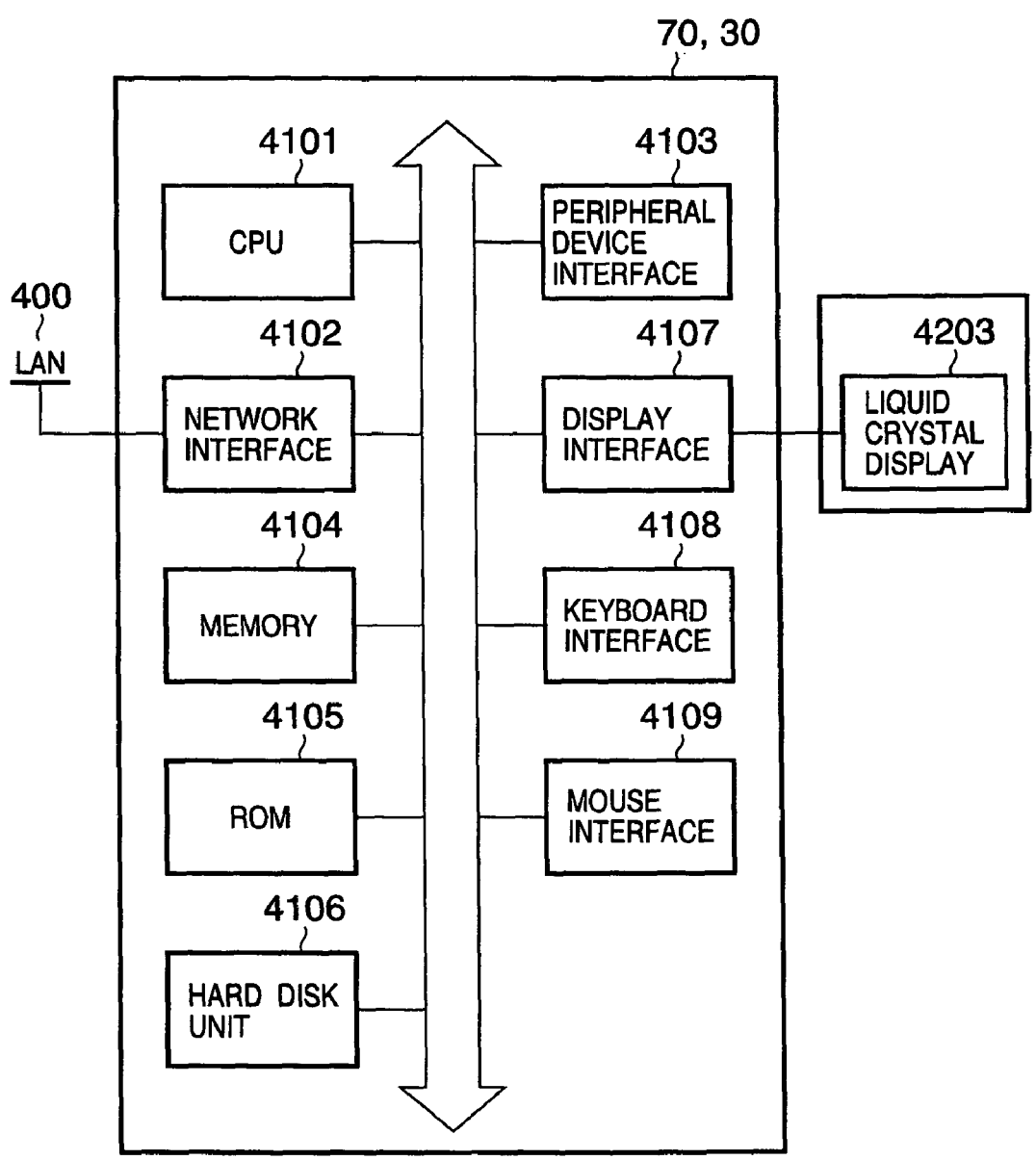
FIG. 14 is a block diagram for explaining the hardware configuration of a requirement management server and service provider in the fourth embodiment.

FIG. 14 is a block diagram for explaining the hardware configuration of the requirement management server 70 and service provider 30 shown in FIG. 13.

Referring to FIG. 14, a CPU 4101 is a central processing unit which controls the whole device. The CPU 4101 loads programs stored in a ROM 4105 and hard disk unit 4106 into a memory 4104 and executes the loaded programs.

A network interface 4102 is a controller which communicates data with other apparatuses across the network.

The software executed by the CPU 4101 can bidirectionally exchange data with MFP devices (including the MFP device 20 shown in FIG. 13), other network apparatuses, and other computers across a LAN 400.

A peripheral device interface 4103 is a controller which controls peripheral devices. The memory 4104 is generally a volatile memory for storing instructions to be executed by the CPU 4101 and data.

The ROM 4105 is a read-only memory for storing a program for performing basic hardware control and data. The hard disk unit 4106 is generally a nonvolatile memory for storing programs to be executed by the PC main body and operated data.

The hard disk unit 4106 can store a boot program (an activation program: a program for starting execution (operation) of hardware or software), applications, edited files, user files, a network management program, and the like.

In the hard disk unit 4106 of the service provider 30, a database (of the service provider 30) for registering data acquired from the MFP device 20 is secured. The service provider 30 acquires, from the MFP device 20, image data for which an electronic signature, document attribute, and the like are set. Each data acquired from the MFP device 20 is registered in the hard disk unit 4106.

A display interface 4107 is a controller for connecting a liquid crystal display 4203 which displays the internal state of the PC, the execution state, and the like.

The software executed by the CPU 4101 can draw a graphical user interface on the liquid crystal display 4203.

The liquid crystal display 4203 is driven by the display interface 4107.

A keyboard interface 4108 and mouse interface 4109 can connect input devices which allow the user to input data and instructions to a computer.

The peripheral device interface 4103 is a controller for connecting a peripheral device having a specification such as USB, RS-232C serial, or IEEE1394.

The sequence of the MFP 20 according to the fourth embodiment is substantially the same as in the first embodiment. That is, the MFP 20 performs processing in accordance with the sequence shown in FIG. 3. Also, the processes in steps S101 to S108 are the same as shown in FIGS. 4 to 10.

Accordingly, processing unique to the fourth embodiment will be explained below.

Figure 15:
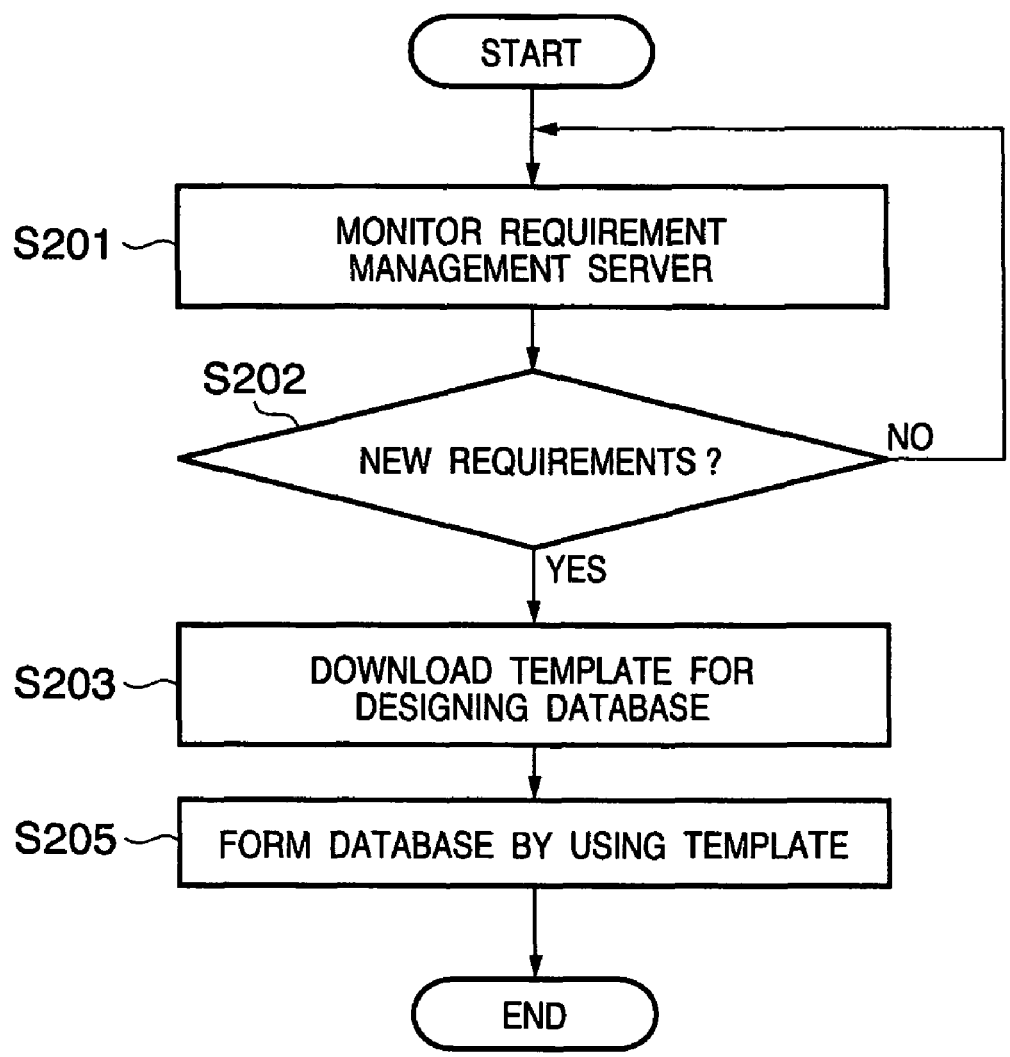
FIG. 15 is a flowchart showing the sequence of the service provider in the fourth embodiment.

FIG. 15 shows the sequence of the CPU 4101 of the service provider 30 according to the fourth embodiment.

S201 to S205 shown in FIG. 15 indicate individual steps. Each step is implemented by the CPU 4101 shown in FIG. 14 by loading the control program stored in the hard disk unit 4106 or the like into the memory 4104 and executing the loaded program.

First, in step S201, the service provider 30 periodically accesses the requirement management server 70 by a predetermined protocol. In step S202, the service provider 30 determines whether new requirements are registered in the requirement management server 70.

In the fourth embodiment, requirements indicate pieces of information clearly describing, e.g., the type of document to be scanned, information to be saved when the document is scanned, and template information for forming a database necessary to save the information.

Note that in a case in which new requirements are registered in the requirement server 70 while the service provider 30 does not access the requirement server 70, the requirement management server 70 may also notify the service provider 30 of the newly registered requirements.

The template for forming a database contains detailed database design information, such as the name and data type of each attribute, for storing attribute data of a scan image to be saved. That is, the template contains database information for storing attribute information (search index) which is determined in accordance with the type of document.

Note that the template for forming a database in the service provider 30 may also contain another information.

If the service provider 30 detects that new requirements are registered in the requirement management server 70, the flow advances to step S203. In step S203, the service provider 30 downloads a template for forming a database from the requirement management server 70.

In step S205, the service provider 30 registers the downloaded template corresponding to the new document in the database formed in the hard disk unit 4106, and terminates the processing.

Note that this registration process may also be operated by the administrator of the service provider 30. In this case, when the template is downloaded in step S203, it is only necessary to notify the administrator of the service provider 30 by e-mail by using the MFP 20. The mail address and the like of this administrator need only be preregistered in the hard disk unit 4106.

As described above, the database for saving the type of document, the reading conditions for scanning the document, and the like can always be maintained in the latest state in the service provider 30.

The processing by the MFP 20 is the same as in the first embodiment already explained. That is, the sequence of the MFP 20 according to the fourth embodiment is performed in accordance with the sequence shown in FIG. 3. Also, the processes in steps S101 to S108 are the same as in FIGS. 4 to 10.

Figure 7:
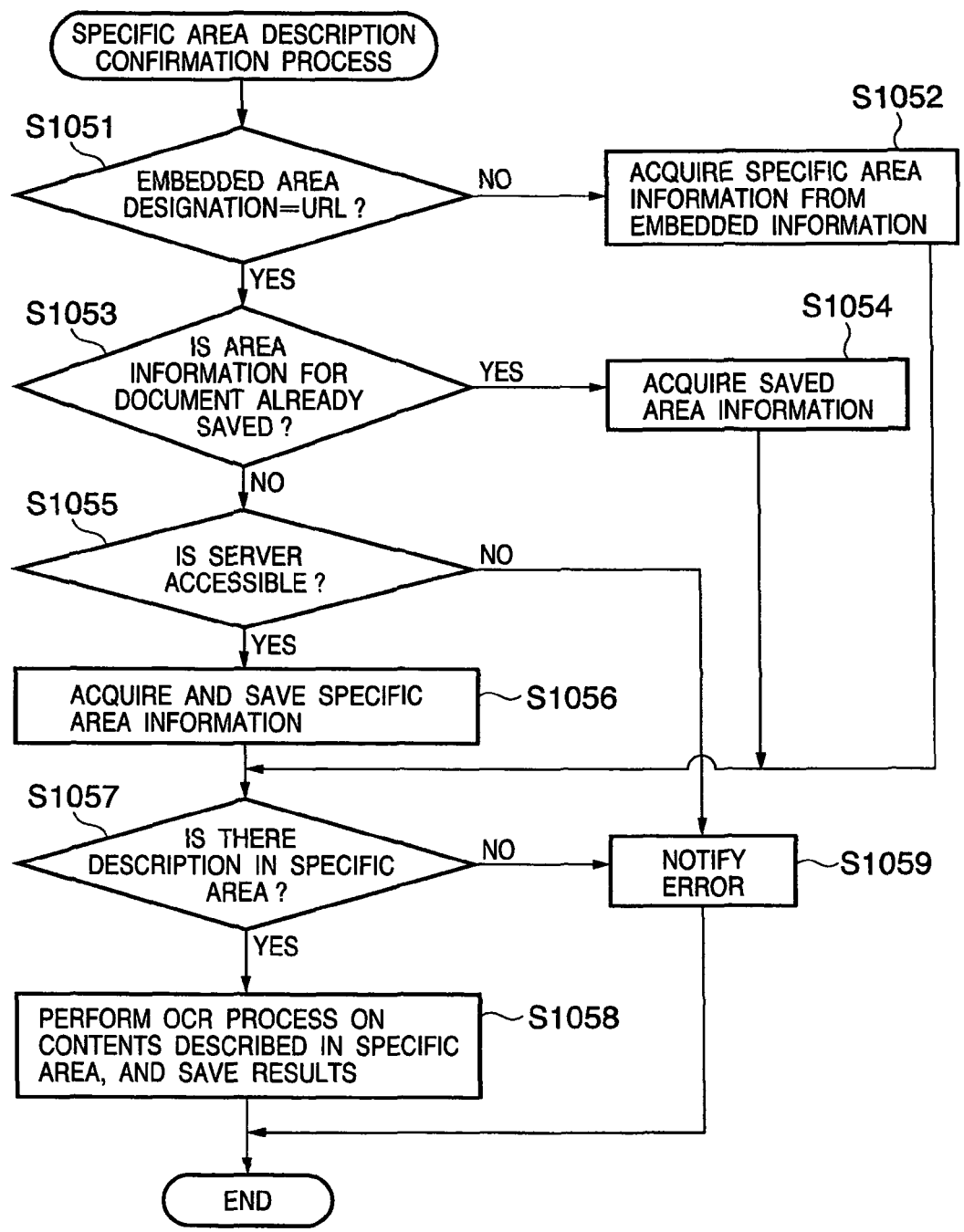
FIG. 7 is a flowchart showing a sequence of confirming whether there is a description in a specific area of prescanned data in the document registration system according to the embodiment.

Note that if a CPU 201 of the MFP 20 advances from step S1021 to step S1022 in FIG. 7 and the URL embedded as a barcode In a document 10 is the address of the requirement management server 70, scan setting information is acquired from the requirement management server 70. In step S1023, the CPU 201 of the MFP 20 may also determine whether the version of the scan setting information stored in the MFP 20 is the same as that of the scan setting information managed by the requirement management server 70.

In the fourth embodiment as described above, even when a new document page (form) is registered, the document can be automatically registered.

Note that when the MFP 20 selects a folder to be stored in the file server of the service provider 30, the storage destination folder may also be determined to some extent in accordance with the type of read document page.

Assume that the type of document page to be stored is determined in accordance with each folder, and a database designed to manage attribute information of the stored document page is formed and saved for each folder. Note that this database is formed on the basis of the template explained earlier.

Figure 16:
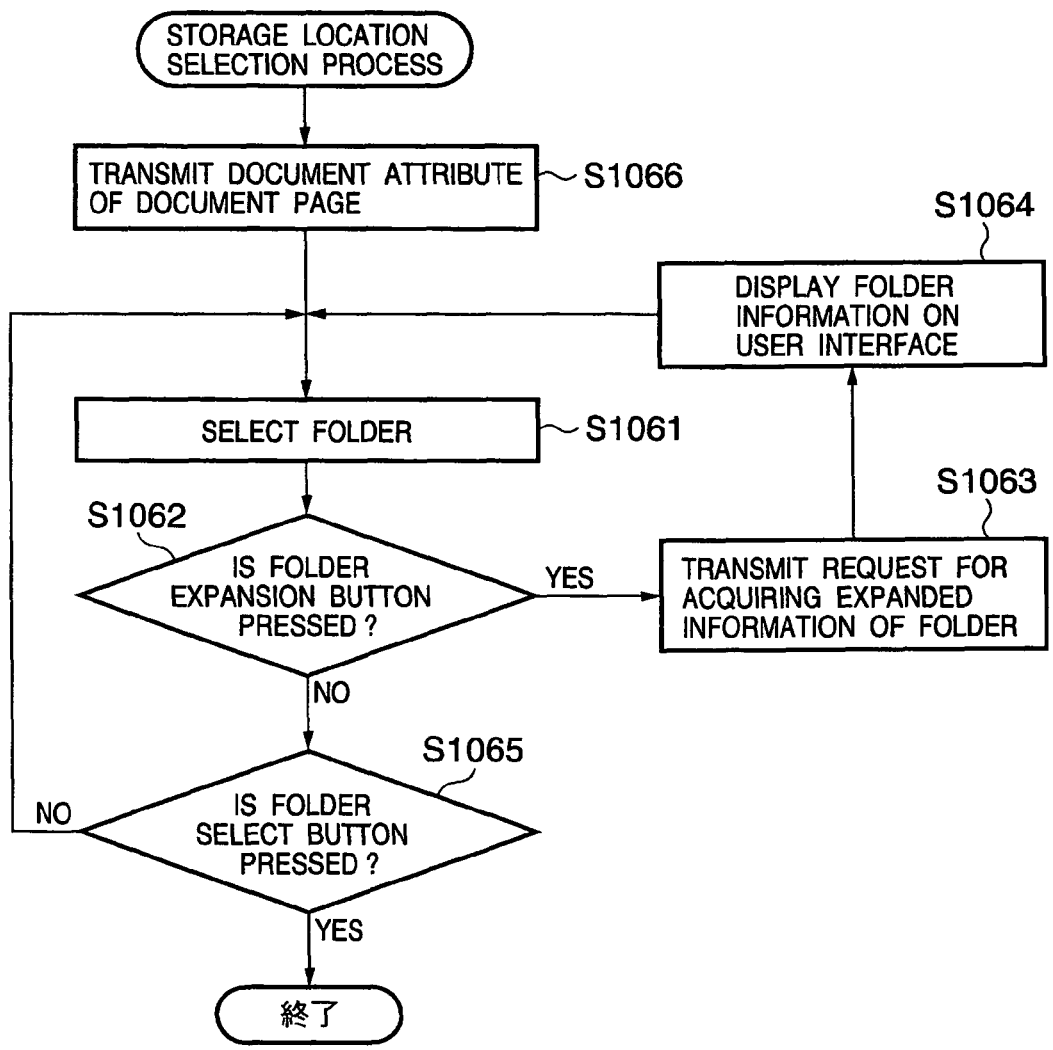
FIG. 16 is a flowchart showing a sequence of designating a storage location in the service provider in the fourth embodiment.

In this case, the MFP 20 need only transmit, to the service provider 30, that attribute information indicating the type of document page, which is obtained from a barcode when the document page is prescanned. In response to this, the service provider 30 presents, to the MFP, only a folder having a database matching the received document type as a candidate for the storage destination. FIG. 16 is a flowchart showing the sequence which replaces FIG. 8. As shown in FIG. 16, in the first step, S1066, a process of transmitting the attribute information indicating the type of document page to the service provider 30 is added to the MFP 20. The user interface presents only candidates (folders) for the storage destination matching the document type. The other steps are the same as those shown in FIG. 8, so an explanation thereof will be omitted.

This arrangement facilitates selection of a storage destination matching the type of document page.

Fifth Embodiment

Figure 17:
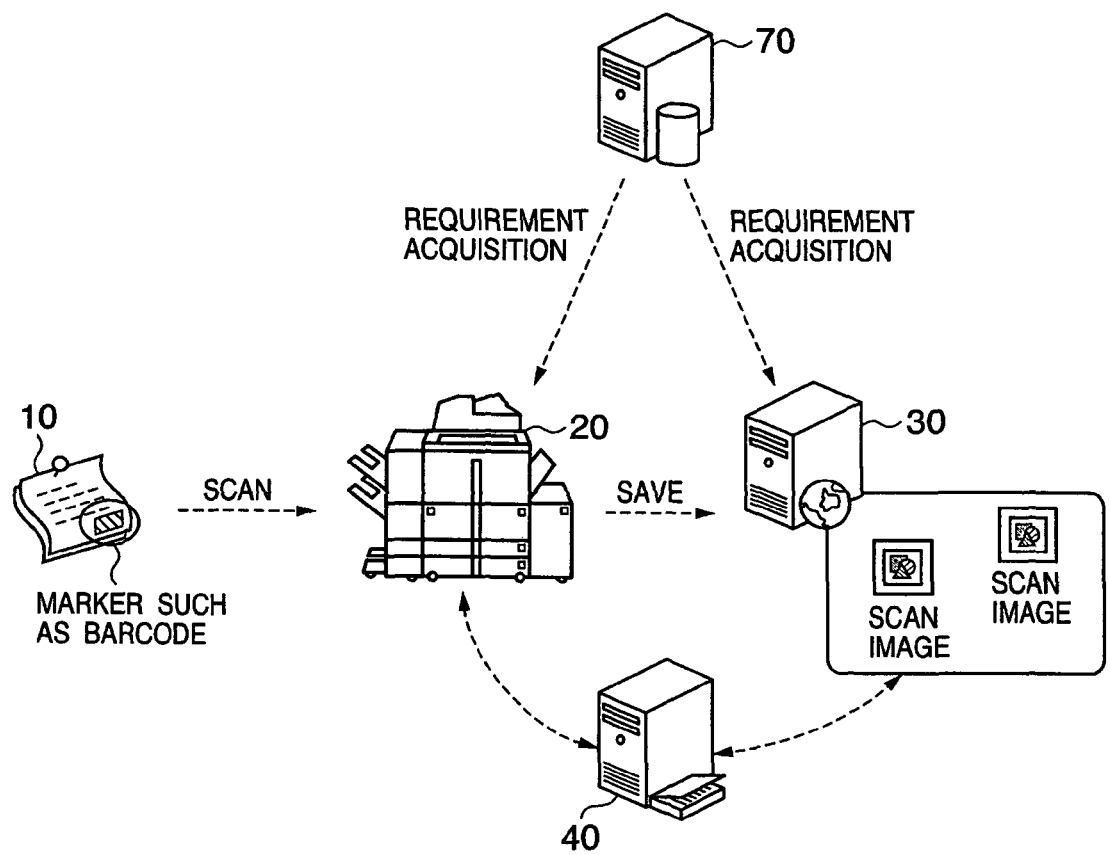
FIG. 17 is a view showing the system configuration of a document registration system of the fifth embodiment.

FIG. 17 is a view showing the system configuration of a document registration system according to the fifth embodiment of the present invention, to which an image processor and server apparatus can be applied. The fifth embodiment is a modification of the second embodiment already described. Note that the same reference numerals as in FIG. 13 denote the same parts.

Referring to FIG. 17, an MFP device 20 has a document 10 on which setting information is printed/added as a marker such as a barcode, and an application browser function for the document registration system according to this embodiment. Also, the MFP 20 is connected across a LAN to a service provider 30 which functions as a Web storage server having the function of a document management server, and an active directory server 40 for performing user management. In addition, the MFP device 20 is connected across the Internet to a requirement management server 70 for managing templates for designing a database capable of storing document information to be saved in accordance with various document pages.

The fifth embodiment differs from the document registration system according to the fourth embodiment in that no IC card reader 21 connectable to the MFP device 20 exists. That is, the active directory server 40 performs coordinated user management (Single Sign-On) on the MFP device 20 and service provider 30.

When logging in to the MFP device 20, therefore, the user does not insert any IC card into the IC card reader 21. Instead, the user directly inputs data to a login user interface (not shown) displayed on a display device 202 of the MFP device 20 by an application for the document registration system according to the second embodiment.

Also, in the document registration system according to the fourth embodiment, an electronic certificate exists in an IC card. However, in the document registration system according to the fifth embodiment, the active directory server 40 manages the electronic certificate of each user.

Accordingly, the user can use the electronic certificate for adding an electronic signature to scan data without carrying any IC card.

Note that the electronic certificate may also be saved in the MFP device 20 in relation to the user via the user interface (not shown) of the MFP device 20.

In this case, the user can be surely specified by an electronic signature added to scan data even in an environment in which the active directory server 40 does not perform any coordinated user management on the MFP device 20 and service provider 30.

Also, the user can use the document registration system according to the fifth embodiment without carrying any medium such as an IC card.

Sixth Embodiment

Figure 18:
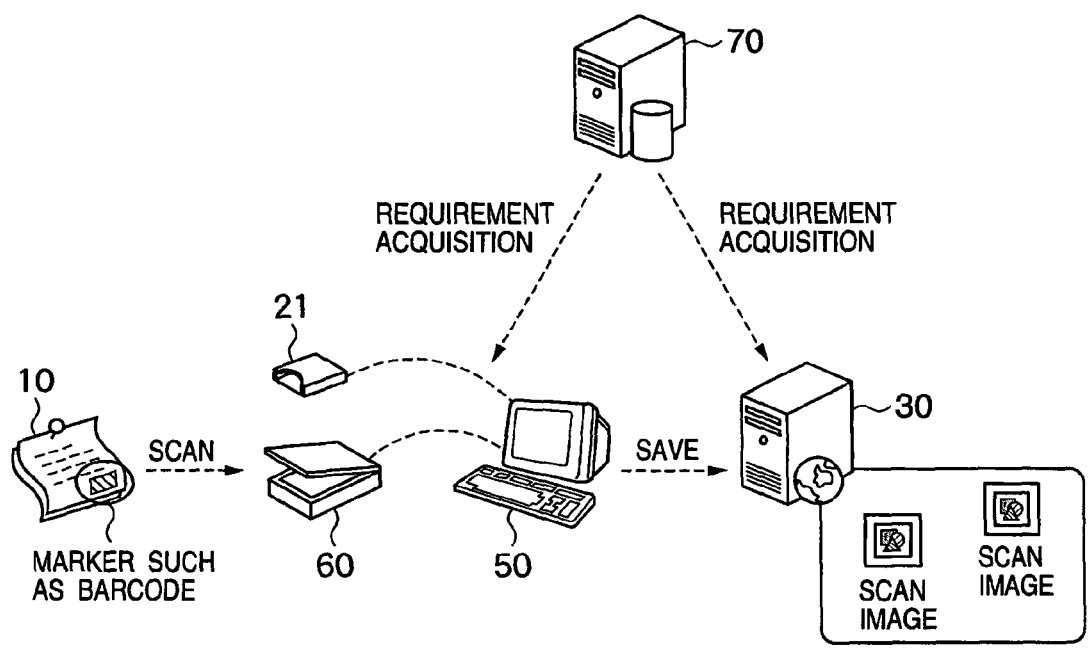
FIG. 18 is a view showing the system configuration of a document registration system of the sixth embodiment.

FIG. 18 is a view showing the system configuration of a document registration system according to the sixth embodiment of the present invention, to which an image processor and server apparatus can be applied. The sixth embodiment is a modification of the third embodiment already described. Note that the same reference numerals as in FIG. 13 denote the same parts.

Referring to FIG. 18, a document 10 has setting information which is printed/added as a marker such as a barcode, and a client PC 50 contains an application for the document registration system according to this embodiment. A service provider 30 having the function of a document management system is connected across a LAN. The client PC 50 is connected to an IC card reader 21 and consumer scanner device 60 via cables such as USBs.

In addition, a requirement management server 70 which manages templates for designing a database capable of storing document information to be saved in accordance with various document pages is connected across the Internet.

In the sixth embodiment, a case in which the individual components are connected across a LAN will be described. However, these components may also be connected across the Internet.

Also, although a case in which only one consumer scanner 60 exists will be explained, a plurality of consumer scanners may also exist.

Furthermore, the consumer scanner 60 and IC card reader 21 may also be connected via a medium/method other than the USB.

Also, a medium connected to the consumer scanner 60 need not be the IC card reader 21. That is, it is only necessary to connect a medium such as a flexible disk or USB memory in which an electronic certificate capable of specifying an individual user can be saved.

Note that in the sixth embodiment, an electronic certificate capable of specifying an individual user is saved in an IC card or the like. However, it is also possible to save an electronic certificate in the client PC 50 in relation to the user via a user interface (not shown) of the client PC 50.

In some cases, an active directory server (not shown) performs coordinated user management (SSO) on the client PC 50 and service provider 30. In a case like this, if this active directory server manages the electronic certificate of each user, the user can use the electronic certificate for adding an electronic signature to scan data when logging in to the client PC 50.

The difference of the sixth embodiment from the document registration systems according to the fourth and fifth embodiments is that the scanner device for reading the document 10 is not an MFP device but a consumer scanner. Note that the application which implements the document registration system according to the sixth embodiment exists on the client PC 50.

Accordingly, the user can use the document registration system according to the sixth embodiment by using the inexpensive consumer scanner device 60 without using any expensive scanner device such as the MFP device 20 having many functions.

The document registration system according to the sixth embodiment allows the user to use the system by using not the MFP device 20 which is expensive as a scanner device but the inexpensive consumer scanner device 60.

Note that when the sixth embodiment is applied, the configuration of programs installed in the PC 50 has a structure shown in FIG. 19.

FIG. 19 is the memory map of a storage medium storing various data processing programs readable by the PC 50.

Although not shown, this storage medium sometimes additionally stores information, such as the version information and the creator, for managing the programs stored in the storage medium, and information dependent on an OS or the like on the program read side, e.g., icons for identifying the programs.

Furthermore, data which belong to various programs are also managed in the directory. In addition, a program for installing various programs in a computer, a program for expanding a compressed program to be installed, and the like are also stored in some cases.

Figure 8:
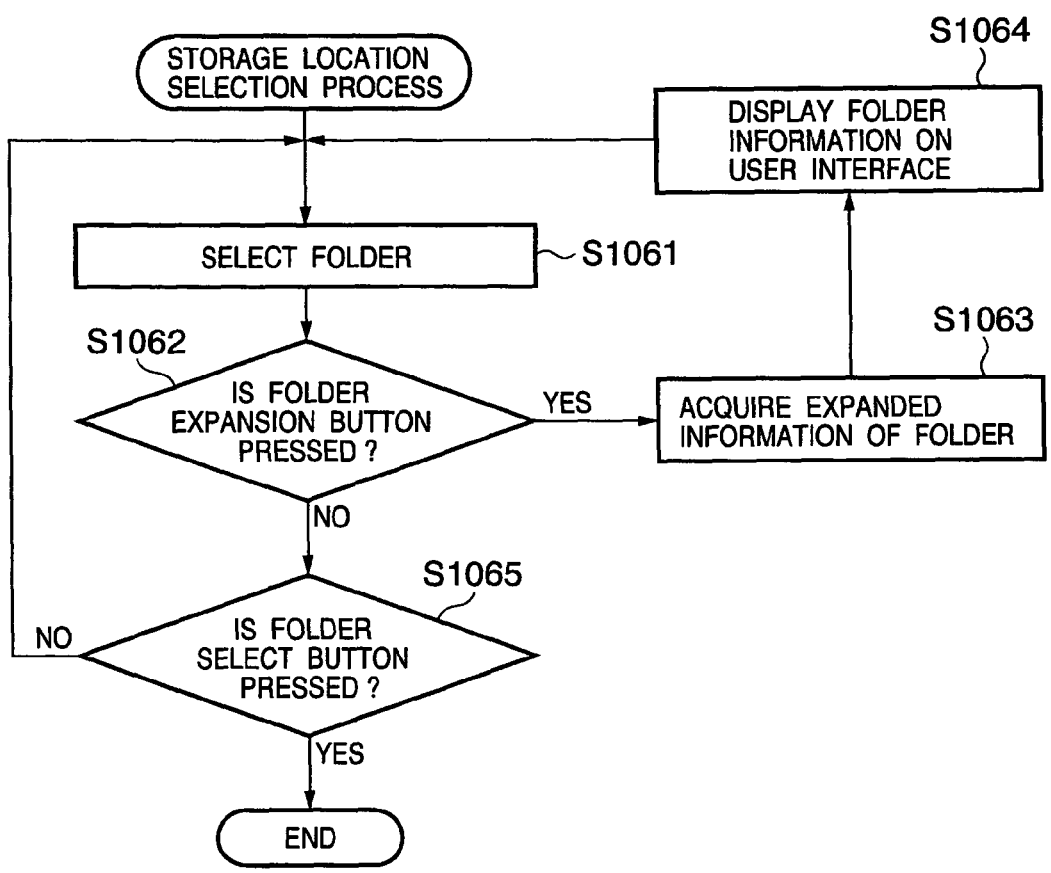
FIG. 8 is a flowchart showing a sequence of designating a storage location in a service provider in the document registration system according to the embodiment.

When the sixth embodiment is to be applied, a storage medium storing programs of the functions shown in FIGS. 3 to 10 or in FIG. 16 which replaces FIG. 8 is set and installed in a host computer. A CPU of the host computer constructs the system of the sixth embodiment by executing the programs. Note that the storage medium can be a CD-ROM, flash memory, FD, or the like.

Other Embodiment

In each of the above embodiments, the document 10 is read on the basis of, e.g., the reading conditions acquired from the requirement management server 70, and the document and its electronic certificate are registered in the service provider 30. However, the present invention is also applicable to a system in which the requirement management server 70 and service provider 30 are integrated into one server apparatus.

In each of the above embodiments, a visually identifiable pattern image such as a barcode on the document 10 is read. On the other hand, the "watermark" technique by which an image appears in a portion of the document 10 where nothing is apparently drawn, when this portion is irradiated with strong light from the opposite side, is used for paper money and the like. Therefore, the present invention is applicable even when the embedded information of the document 10 is an electronic watermark in which invisible data is embedded.

Since the present invention can also be implemented by a computer program as explained previously, a storage medium storing the program code constitutes the present invention.

The program can also be supplied by connecting to a homepage on the Internet by using a browser of a client computer, and downloading the computer program itself of the present invention or a compressed file including an automatic installation function from the homepage to a recording medium such as a hard disk. It is also possible to divide the program code forming the program of the present invention into a plurality of files, and download the individual files from different homepages. That is, the claims of the present invention include, e.g., a WWW server or ftp server which allows a plurality of users to download a program file for implementing the functional processing of the present invention by a computer.

Furthermore, it is also possible to encrypt the program of the present invention, store the encrypted program in storage media such as CD-ROMs, and distribute these storage media to users. In this case, a user who has cleared predetermined conditions is allowed to download key information for decryption from a homepage across the Internet. The encrypted program can be executed and installed in a computer by using the key information.

Also, besides the functions of the above embodiments are implemented by executing the readout program code by the computer, the functions of the embodiments can be implemented when an OS (operating System) or the like running on the computer performs part or the whole of actual processing on the basis of instructions by the program code.

Furthermore, the functions of the above embodiments can be implemented when the program code read out from the storage medium is written in a memory of a function expansion board inserted into the computer or of a function expansion unit connected to the computer, and a CPU or the like of the function expansion board or function expansion unit performs part or the whole of actual processing on the basis of instructions by the program code.

The present invention is not limited to the above embodiments, and various modifications (including organic combinations of the embodiments) can be made on the basis of the spirit and scope of the invention. Therefore, these modifications are not excluded from the range of the present invention.

Various examples and embodiments of the present invention have been explained above. However, it is apparent to those skilled in the art that the spirit and scope of the present invention are not limited to any specific explanation in this specification.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-148554, filed May 20, 2005, and No. 2005-347868, filed Dec. 1, 2005, which are hereby incorporated by reference herein in their entirety.

What is claimed is:

1. A document image processing apparatus comprising:
   embedded information acquiring means for acquiring information embedded in first image data of a document;
   electronizing condition acquiring means for acquiring an electronizing condition of the document by accessing a server designated by address information contained in the embedded information acquired by said embedded information acquiring means;
   image acquiring means for acquiring second image data by reading the document on the basis of the acquired electronizing condition;
   adding means for adding at least one of electronic signature information and time stamp information to the second image data acquired by said image acquiring means; and
   storage means for storing, in a data storage device, the second image data to which at least one of the electronic signature information and the time stamp information is added by said adding means.

2. The apparatus according to claim 1, further comprising input means for inputting identification information for identifying a user,
   wherein said adding means adds the electronic signature information to the second image data on the basis of the identification information input by said input means.

3. The apparatus according to claim 2, wherein said input means inputs electronic certificate information serving as the identification information for identifying a user, from a storage medium storing the electronic certificate information.

4. The apparatus according to claim 2, wherein said input means inputs electronic certificate information serving as the identification information for identifying a user, from a server managing the electronic certificate information.

5. The apparatus according to claim 3, further comprising means for accessing a server which finds whether the electronic certificate information is valid/invalid, and determining validity of the electronic certificate information, wherein if the electronic certificate information is found to be invalid, error notification is performed, and, if the electronic certificate information is found to be valid, said adding means adds the electronic signature information to the second image data.

6. The apparatus according to claim 1, wherein said electronizing condition acquiring means acquires information about selection of one of a color mode and a monochrome mode for reading the document, a number of tone levels for reading, a density, a reading resolution, and a data format of a read image.

7. The apparatus according to claim 1, further comprising means for accessing a time stamp server and acquiring the time stamp information from the time stamp server.

8. A document image processing apparatus comprising:

embedded information acquiring means for acquiring information embedded in first image data of a document;

electronizing condition acquiring means for acquiring an electronizing condition of the document on the basis of the embedded information acquired by said embedded information acquiring means;

image acquiring means for acquiring second image data by reading the document on the basis of the acquired electronizing condition;

adding means for adding at least one of electronic signature information and time stamp information to the second image data acquired by said image acquiring means; and storage means for storing, in a data storage device, the second image data to which at least one of the electronic signature information and the time stamp information is added by said adding means, wherein said electronizing condition acquiring means comprises specific area information acquiring means for acquiring information indicating a specific area as an indispensable description item, as one of the electronizing conditions, on the basis of the embedded information, and the document image processing apparatus further comprises:

means for determining whether there is a description in a position of the indispensable description item of the first image data; and error notifying means for notifying an error if it is determined that there is no description in the indispensable description item.

9. The apparatus according to claim 8, wherein said specific area information acquiring means acquires information indicating the specific area by accessing a server designated by address information contained in the embedded information.

10. The apparatus according to claim 1, further comprising:

character recognizing means for performing a character recognizing process on a content described in a specific area; and saving means for saving a result of the character recognizing process performed by said character recognizing means in a database.

11. The apparatus according to claim 1, further comprising prescanning means for obtaining the first image data by reading the document under a predetermined reading condition.

12. The apparatus according to claim 1, further comprising storage destination selecting means for selecting a storage destination of the second image data to be stored by said storage control means.

13. The apparatus according to claim 12, wherein when said storage destination selecting means selects a storage destination, a storage destination suited to storing the document is presented to a user.

14. A document image processing apparatus comprising:

embedded information acquiring means for acquiring information embedded in first image data of a document;

electronizing condition acquiring means for acquiring an electronizing condition of the document on the basis of the embedded information acquired by said embedded information acquiring means;

image acquiring means for acquiring second image data by reading the document on the basis of the acquired electronizing condition;

adding means for adding at least one of electronic signature information and time stamp information to the second image data acquired by said image acquiring means; and storage means for storing, in a data storage device, the second image data to which at least one of the electronic signature information and the time stamp information is added by said adding means, wherein when the embedded information is address information of a condition server storing an electronizing condition, said electronizing condition acquiring means determines whether an electronizing condition corresponding to the address information is already held, acquires the held electronizing condition if it is determined that the electronizing condition is held, and acquires the electronizing condition by accessing the condition server in accordance with the address information if it is determined that the electronizing condition is not held.

15. The apparatus according to claim 1, further comprising attribute information acquiring means for acquiring attribute information of the document by performing a character recognizing process on one of the first image data and the second image data in accordance with the electronizing condition, wherein said storage means stores, in said data storage device, the acquired attribute information together with the second image data to which the time stamp information is added.

16. A control method of a document image processing apparatus, the method comprising:

an embedded information acquisition step of acquiring embedded information embedded in first image data of a document;

an electronizing condition acquisition step of acquiring an electronizing condition of the document by accessing a server designated by address information contained in the embedded information acquired in the embedded information acquisition step;

an image acquisition step of acquiring second image data by reading the document on the basis of the acquired electronizing condition;

an addition step of adding at least one of electronic signature information and time stamp information to the second image data acquired in the image acquisition step; and a storage step of storing, in a data storage device, the second image data to which at least one of the electronic signature information and the time stamp information is added in the addition step.

17. A computer readable storage medium storing a computer program for causing a computer to function as a document image processing apparatus when the computer program is executed by the computer, the computer functioning, by executing the computer program, as the apparatus comprising:
    embedded information acquiring means for acquiring embedded information embedded in first image data of a document;
    electronizing condition acquiring means for acquiring an electronizing condition of the document by accessing a server designated by address information contained in the embedded information acquired by said embedded information acquiring means;
    image acquiring means for acquiring second image data by reading the document on the basis of the acquired electronizing condition;
    adding means for adding at least one of electronic signature information and time stamp information to the second image data acquired by said image acquiring means; and
    storage means for storing, in a data storage device, the second image data to which at least one of the electronic signature information and the time stamp information is added by said adding means.

18. A control method of a document image processing apparatus, the method comprising:
    acquiring information embedded in first image data of a document;
    acquiring an electronizing condition of the document on the basis of the acquired embedded information;
    acquiring second image data by reading the document on the basis of the acquired electronizing condition;
    adding at least one of electronic signature information and time stamp information to the acquired second image data;
    storing, in a data storage device, the second image data to which at least one of the electronic signature information and the time stamp information is added,
    wherein information indicating a specific area as an indispensable description item is acquired, as one of the electronizing conditions, on the basis of the embedded information, and
    wherein the method further comprises:
    determining whether there is a description in a position of the indispensable description item of the first image data; and
    notifying an error if it is determined that there is no description in the indispensable description item.

19. A control method of a document image processing apparatus, the method comprising:
    acquiring information embedded in first image data of a document;
    acquiring an electronizing condition of the document on the basis of the acquired embedded information;
    acquiring second image data by reading the document on the basis of the acquired electronizing condition;
    adding at least one of electronic signature information and time stamp information to the acquired second image data; and
    storing, in a data storage device, the second image data to which at least one of the electronic signature information and the time stamp information is added,
    wherein when the embedded information is address information of a condition server storing an electronizing condition, a determination is made as to whether an electronizing condition corresponding to the address information is already held, the held electronizing condition is acquired if it is determined that the electronizing condition is held, and the electronizing condition is acquired by accessing the condition server in accordance with the address information if it is determined that the electronizing condition is not held.

20. A computer readable storage medium storing a computer program for causing a computer to function as a document image processing apparatus when the computer program is executed by the computer, the computer functioning, by executing the computer program, as the apparatus comprising:
    embedded information acquiring means for acquiring information embedded in first image data of a document;
    electronizing condition acquiring means for acquiring an electronizing condition of the document on the basis of the embedded information acquired by said embedded information acquiring means;
    image acquiring means for acquiring second image data by reading the document on the basis of the acquired electronizing condition;
    adding means for adding at least one of electronic signature information and time stamp information to the second image data acquired by said image acquiring means; and
    storage means for storing, in a data storage device, the second image data to which at least one of the electronic signature information and the time stamp information is added by said adding means,
    wherein said electronizing condition acquiring means comprises specific area information acquiring means for acquiring information indicating a specific area as an indispensable description item, as one of the electronizing conditions, on the basis of the embedded information, and
    wherein the document image processing apparatus further comprises:
    means for determining whether there is a description in a position of the indispensable description item of the first image data; and
    error notifying means for notifying an error if it is determined that there is no description in the indispensable description item.

21. A computer readable storage medium storing a computer program for causing a computer to function as a document image processing apparatus when the computer program is executed by the computer, the computer functioning, by executing the computer program, as the apparatus comprising:
    embedded information acquiring means for acquiring information embedded in first image data of a document;
    electronizing condition acquiring means for acquiring an electronizing condition of the document on the basis of the embedded information acquired by said embedded information acquiring means;
    image acquiring means for acquiring second image data by reading the document on the basis of the acquired electronizing condition;

adding means for adding at least one of electronic signature information and time stamp information to the second image data acquired by said image acquiring means; and storage means for storing, in a data storage device, the second image data to which at least one of the electronic signature information and the time stamp information is added by said adding means, wherein when the embedded information is address information of a condition server storing an electronizing condition, said electronizing condition acquiring means determines whether an electronizing condition corresponding to the address information is already held, acquires the held electronizing condition if it is determined that the electronizing condition is held, and acquires the electronizing condition by accessing the condition server in accordance with the address information if it is determined that the electronizing condition is not held.

* * * * *